US008774311B2

(12) United States Patent
Kanellakopoulos et al.

(10) Patent No.: US 8,774,311 B2
(45) Date of Patent: Jul. 8, 2014

(54) METHOD AND SYSTEM FOR APPLYING DYNAMIC SPECTRAL SHAPING TO DIGITAL SUBSCRIBER LOOP COMMUNICATION SYSTEMS

(75) Inventors: Ioannis Kanellakopoulos, Cupertino, CA (US); Amit Priebatch, Kfar Saba (IL); Amit Levy, Kiryat Bialik (IL); Maya Bar-El, Hod-Hasharon (IL)

(73) Assignee: Actelis Networks (Israel) Ltd., Petach Tikva (IL)

( * ) Notice: Subject to any disclaimer, the term of this patent is extended or adjusted under 35 U.S.C. 154(b) by 520 days.

(21) Appl. No.: 13/056,951

(22) PCT Filed: Jul. 31, 2009

(86) PCT No.: PCT/US2009/052455
§ 371 (c)(1),
(2), (4) Date: May 19, 2011

(87) PCT Pub. No.: WO2010/039328
PCT Pub. Date: Apr. 8, 2010

(65) Prior Publication Data
US 2011/0211623 A1    Sep. 1, 2011

Related U.S. Application Data

(60) Provisional application No. 61/085,695, filed on Aug. 1, 2008.

(51) Int. Cl.
*H04L 25/49*    (2006.01)

(52) U.S. Cl.
USPC ........................................... 375/296

(58) Field of Classification Search
USPC .................. 375/296, 219, 220, 222, 223, 227
See application file for complete search history.

(56) References Cited

U.S. PATENT DOCUMENTS 5,812,777 A    9/1998 Leigh
6,744,811 B1 *  6/2004 Kantschuk ................... 375/222

FOREIGN PATENT DOCUMENTS

EP    1 142 249    10/2004
EP    1 328 081    11/2005
WO    WO 2007/044326    4/2007

OTHER PUBLICATIONS

International Search Report for International Application No. PCT/US2009/052455 mailed Sep. 23, 2009.
Supplementary European Search Report of EP Application No. 09818160 dated Sep. 13, 2013.

* cited by examiner

*Primary Examiner* — Kevin Kim
(74) *Attorney, Agent, or Firm* — Pearl Cohen Zedek Latzer Baratz LLP

(57) ABSTRACT

Mitigation of spectral interference in communications systems such as Digital Subscriber Loop (DSL) systems, and in particular mitigation of spectral interference using dynamic spectral shaping (DSS) in DSL systems, and in particular Single-pair High-speed DSL (SHDSL) systems.

77 Claims, 10 Drawing Sheets

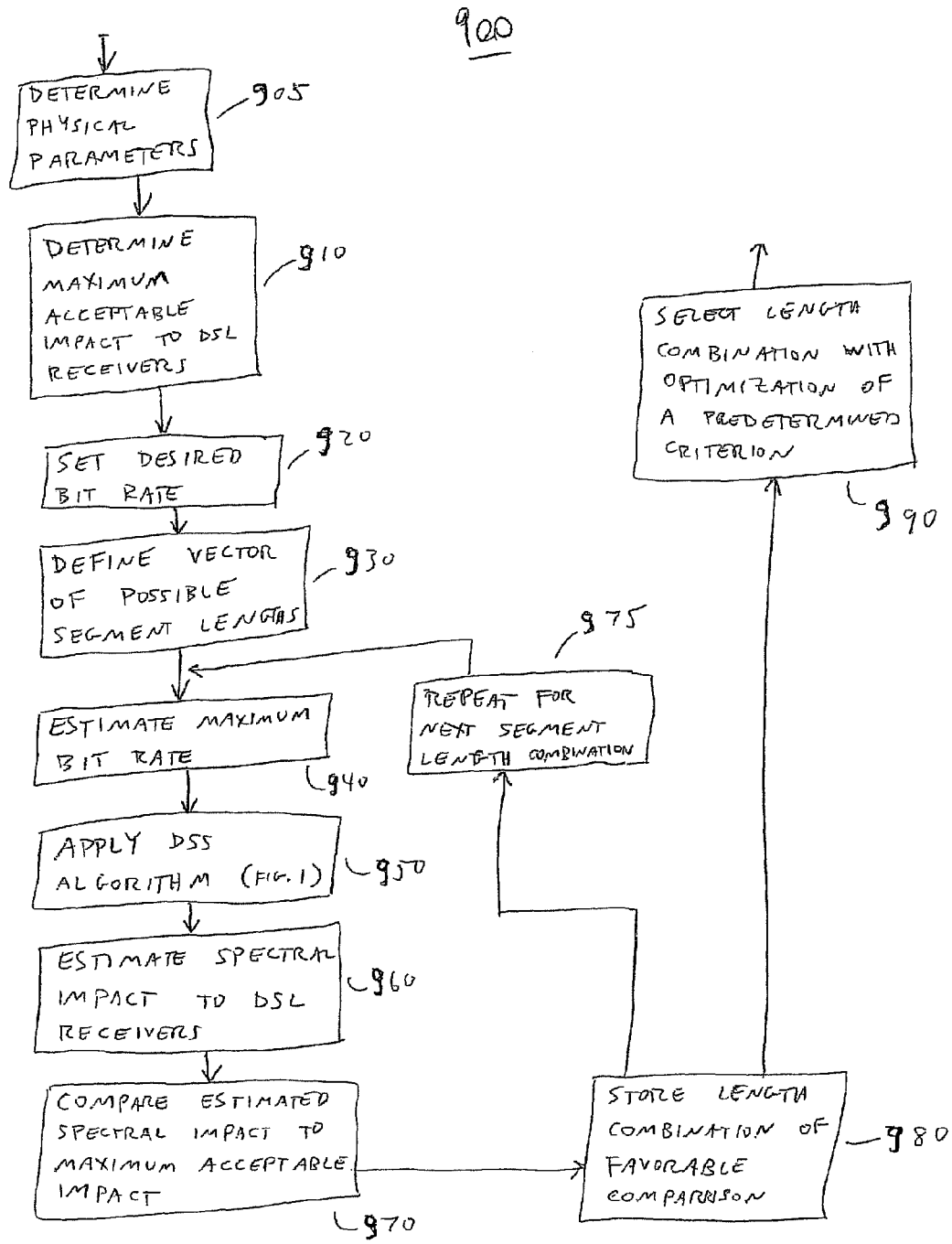

METHOD AND SYSTEM FOR APPLYING DYNAMIC SPECTRAL SHAPING TO DIGITAL SUBSCRIBER LOOP COMMUNICATION SYSTEMS

CROSS-REFERENCE TO RELATED APPLICATIONS

This application is a National Phase Application of PCT International Application No. PCT/US2009/052455, entitled "METHOD AND SYSTEM FOR APPLYING DYNAMIC SPECTRAL SHAPING TO DIGITAL SUBSCRIBER LOOP COMMUNICATION SYSTEMS", International Filing Date Jul. 31, 2009, published on Apr. 8, 2010 as International Publication No. WO 2010/039328, which in turn claims priority from U.S. Provisional Patent Application No. 61/085,695, filed Aug. 1, 2008, both of which are incorporated herein by reference in their entirety.

FIELD OF THE INVENTION

The present invention relates to mitigation of spectral interference in communications systems such as Digital Subscriber Loop (DSL) systems, and in particular mitigation of spectral interference using dynamic spectral shaping (DSS) in DSL systems, and in particular Single-pair High-speed DSL (SHDSL) systems.

BACKGROUND OF THE INVENTION

One of the most effective and efficient methods of deploying high-speed digital services to business and residential customers may be to use one of the many forms of Digital Subscriber Loop (DSL) technologies over copper telephone wires. This approach has become very popular in the last 20 years due to the fact that copper wires are already deployed almost everywhere and are easy to access, both at a Central Office (CO) and at a Remote Terminal (RT) or at a customer premises location.

However, one limitation of DSL technology is that the data capacity of a copper wire pair decreases significantly as the length of that copper wire pair increases. Therefore, customers located more than a few kilometers from a Central Office may not be provided with high data speeds over copper wires.

One way to mitigate this problem may be to use multiple copper pairs to each customer premises location, thereby increasing a total data rate of a resulting multi-pair copper link. This method is often referred to as "bonding" of copper pairs.

Another method for extending reach of DSL services may be to utilize repeaters. Repeaters may be installed in intermediate locations on a copper loop, and may contain one or more transceivers that may receive and re-transmit a signal from and to neighboring devices, including other repeaters. A resulting repeatered copper link may comprise multiple shorter segments that may be connected to each other via repeaters. As a result, the capacity of an original long copper loop may be increased to the capacity of the longest of these multiple shorter segments.

Repeaters may also be combined with bonding to further increase rate and reach of DSL services by using, for example, multiple copper pairs, each of which may be partitioned into multiple repeatered segments.

Deployment of repeaters may face many operational challenges including, but not limited to, installation procedures, proper electrical grounding and shielding, providing power over copper wires, and remote troubleshooting and management to avoid the need to dispatch a technician to a field location every time a problem occurs with one or more of the repeaters.

Another reason that repeaters may not be widely used may be their potential for generating significant spectral interference, for example, to residential DSL services, which have become ubiquitous in the last decade. Spectral interference between different high-bitrate services in a copper binder may be caused by each copper pair acting as an antenna. A signal transmitted on each copper pair, which may be intended for a receiver located at another end of that copper pair, may also inadvertently be received by one or more neighboring copper pairs, because those pairs may not individually be shielded from each other. This phenomenon is often referred to as "crosstalk", aptly named for an effect observed in the early days of the telephone, when a telephone discussion taking place on one line could sometimes be overheard by people conversing on a different line.

Due to some of the physical characteristics of copper pairs, and in particular due to the typical length of the twist between two copper wires making up a copper pair, crosstalk coupling between different pairs may increase dramatically with frequency. But this crosstalk coupling is only one of multiple factors that determine the severity of crosstalk; other determining factors include the power level of the disturbing transmitter and the sensitivity of the disturbed receiver at any given frequency. For example, if a transmitter is transmitting in one frequency band and a nearby receiver is receiving in a completely different frequency band, then there may be almost no crosstalk from this particular transmitter to this particular receiver.

Early repeaters have used Alternate Mark Inversion (AMI) or High Density Bipolar order 3 (HDB3) line codes to deliver T1 (1.544 Mbps) or E1 (2.048 Mbps) services over longer copper loops. These technologies made inefficient use of frequency bands, utilizing almost 2 MHz of frequency spectrum to deliver a mere 1.544 or 2.048 Mbps over 2 copper pairs at distances no longer than 1-1.5 km. Later on, symmetric DSL standards such as HDSL (High-speed DSL), HDSL2, HDSL4 and Single-pair High-speed DSL (SHDSL) allowed deployment of the same T1/E1 services over repeatered copper links while making more efficient use of a frequency spectrum and reducing the number of repeater locations and repeatered segments needed to deploy a repeated copper link compared with AMI/HDB3 methods.

Despite these advancements in repeater technology, the proliferation of residential DSL services may have limited potential increases in deployment of repeaters. One reason for this may be that repeaters typically generate much stronger crosstalk into residential DSL receivers than non-repeatered services deployed from a Central Office (CO). As repeaters may be placed much closer to remotely located residential DSL receivers, their interfering signal may encounter much lower attenuation on a short path to those residential DSL receivers that may be in nearby locations, and this interfering signal may be much stronger when it reaches those residential DSL receivers. Since this strong signal may overlap in frequency with a downstream signal of residential DSL services, it may cause significant spectral interference to those affected residential DSL receivers in nearby locations.

As a result, various countries have imposed significant restrictions on the deployment of repeaters in outside loop plants. For example, the American National Standards Institute (ANSI) has issued recommendation T1.417, which specifies that repeaters should only be deployed in North America with a line bitrate of 776/784 kbps per copper pair when used with HDSL4 technology, or a maximum line bitrate of 634 kbps per pair when used with SHDSL technology. This restriction is designed to reduce the upstream frequency band of disturbing signals to approximately 130 kHz, in order to minimize its overlap with the downstream frequency band of residential DSL services, which typically starts at about 140 kHz. Other countries have imposed similar restrictions, for example, some European countries limit the bitrate of repeaters to 1 Mbps per copper pair.

These restrictions may have limited the use of repeaters for delivery of high-speed data services. For example, consider the problem of wireless backhaul, which may involve providing a high-speed communications link between a Central Office and wireless basestations, so that these basestations may effectively provide high-speed data services to wireless subscribers. In a particular case where a required bitrate for a backhaul link may be 20 Mbps, and a wireless basestation may be 10 km away from a Central Office, so that repeaters may be required, it may take 26 copper pairs to deliver this service under a restriction of 768 kbps per pair, and 32 pairs under a restriction of 634 kbps per pair. Clearly, utilizing that many copper pairs for one 20 Mbps link may be impractical and expensive.

Therefore, it may be highly desirable to deploy repeaters with significantly higher bitrates per copper pair while ensuring that these repeaters do not generate significant levels of spectral interference to residential DSL services.

SUMMARY OF EMBODIMENTS OF THE INVENTION

A communication system according to embodiments of the invention may comprise: a network terminal including a network terminal (NT) processor operatively connected to one or more network terminal (NT) modems; and one or more communication links connecting the one or more NT modems, respectively, to one or more respective remote terminal (RT) modems, wherein for each of the one or more communication links, the NT processor is adapted to activate the one or more NT modems and corresponding RT modems to achieve a desired bitrate, and to perform the following sequence at least once: obtain a signal-to-noise ratio (SNR) margin for the one or more modem receivers on the respective communication link, determine an excess SNR margin based on an excess of the obtained SNR margin over a desired SNR margin for the one or more modem receivers of the respective communication link, modify constellation size of the corresponding modem transmitter of the respective communication link to a next available constellation size based on a comparison of the excess SNR margin to a first threshold value, and reduce transmission power of the corresponding modem transmitter of the respective communication link if the excess SNR margin is greater than a second threshold value.

According to some embodiments of the invention, there is provided a method for operating a system including a network terminal and a remote terminal connected by one or more communication links, wherein each communication link includes one or more modem transmitters connected to one or more corresponding modem receivers, the method comprising: activating the one or more modem transmitters and corresponding modem receivers to achieve a desired bitrate; and performing at least once on at least one of the one or more communication links: obtaining a signal-to-noise ratio (SNR) margin for the one or more modem receivers on the respective communication link, determining an excess SNR margin based on an excess of the obtained SNR margin over a desired SNR margin for the one or more modem receivers of the respective communication link, modifying constellation size of the corresponding modem transmitter of the communication link to a next available constellation size based on a comparison of the excess SNR margin to a first threshold value, and reducing transmission power of the corresponding modem transmitter of the communication link if the excess SNR margin is greater than a second threshold value.

A repeatered communication system according to embodiments of the invention may comprise: a network terminal including a network terminal (NT) processor operatively connected to one or more network terminal (NT) modems; and one or more communication links connecting the network terminal to the remote terminal, each communication link having a plurality of link segments connected by repeaters, each repeater adapted to transmit signal-to-noise data to the NT processor, and adapted to modify at least a first transmission characteristic on the respective link segment based on an instruction from the NT processor, wherein for each of the one or more link segments on a communication link, the NT processor is adapted to activate the one or more NT modems and corresponding RT modems to achieve a desired bitrate, and to perform the following sequence at least once: obtain a signal-to-noise ratio (SNR) margin for the one or more modem receivers on the respective link segment, determine an excess SNR margin based on an excess of the obtained SNR margin over a desired SNR margin for the one or more modem receivers of the respective link segment, and modify a first transmission characteristic of the corresponding modem transmitter of the link segment based on a comparison of the excess SNR margin to a first threshold value.

According to some embodiments of the invention, there is provided a method for operating a system including a network terminal and one or more remote terminals connected by one or more respective communication links, each communication link having a plurality of link segments connected by repeaters, the method comprising: activating the link segments to achieve a desired bitrate; and for each of a plurality of link segments in one or more communication links, performing the following at least once: obtaining a signal-to-noise ratio (SNR) margin for the one or more modem receivers on the respective link segment, determining an excess SNR margin based on an excess of the obtained SNR margin over a desired SNR margin for the one or more modem receivers of the respective link segment, and modifying a first transmission characteristic of the corresponding modem transmitter of the link segment based on a comparison of the excess SNR margin to a first threshold value.

BRIEF DESCRIPTION OF THE DRAWINGS

The subject matter regarded as the invention is particularly pointed out and distinctly claimed in the concluding portion of the specification. The invention, however, both as to organization and method of operation, together with objects, features, and advantages thereof, may best be understood by reference to the following detailed description when read with the accompanying drawings in which:

FIG. 9 is a flow diagram illustrating an embodiment of a repeater location planning method with DSS according to the present invention.

Figure 1:
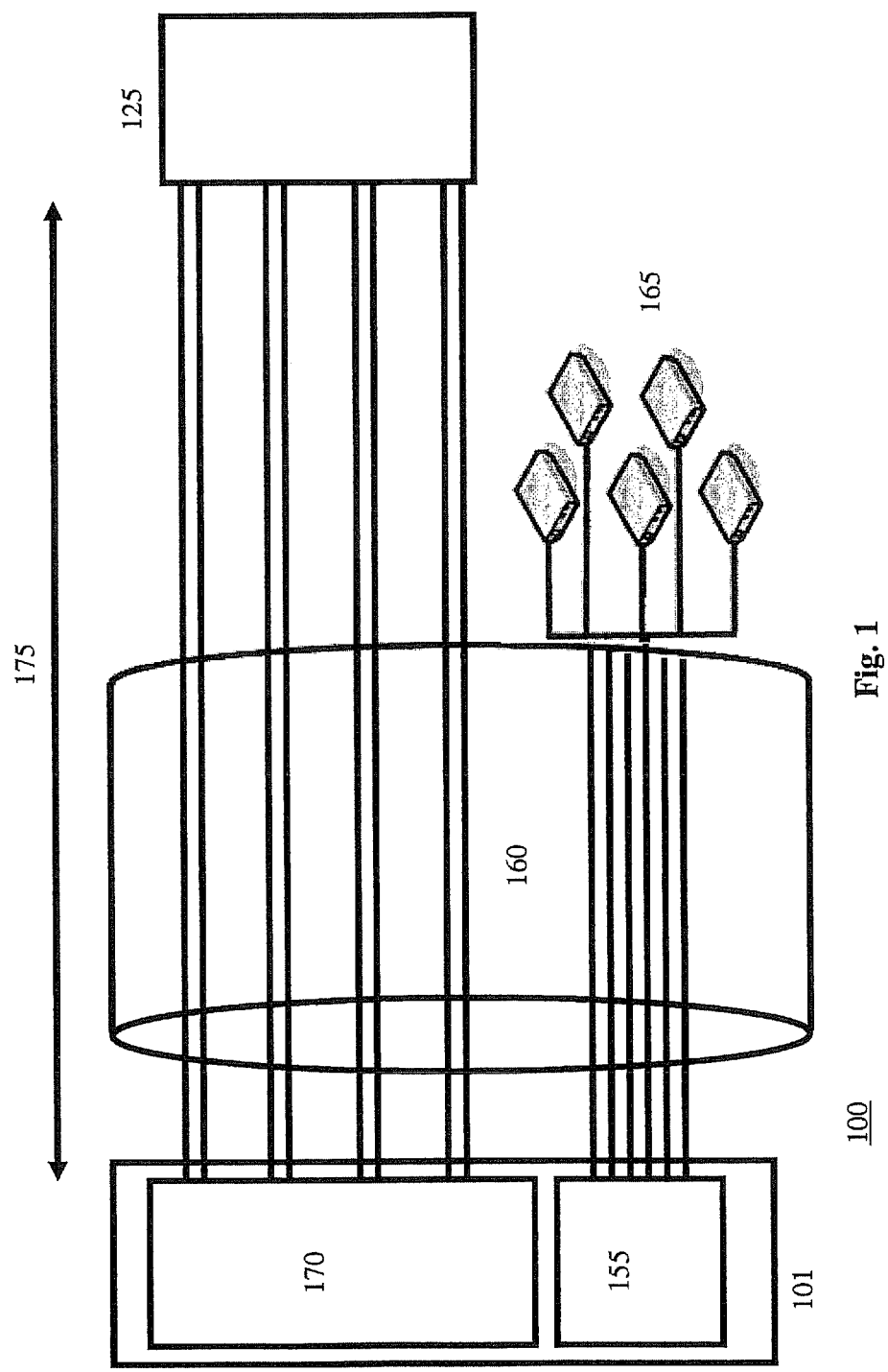
FIG. 1 is a block diagram illustrating a system topology according to embodiments of the present invention.

Embodiments of the invention are illustrated by way of example and not limitation in the figures of the accompanying drawings, in which like reference numerals indicate corresponding, analogous or similar elements. It will be appreciated that for simplicity and clarity of illustration, elements shown in the figures have not necessarily been drawn to scale. For example, the dimensions of some of the elements may be exaggerated relative to other elements for clarity. Further, where considered appropriate, reference numerals may be repeated among the figures to indicate corresponding or analogous elements.

DETAILED DESCRIPTION OF THE PRESENT INVENTION

In the following detailed description, numerous specific details are set forth in order to provide a thorough understanding of the invention. However, it will be understood by those skilled in the art that the present invention may be practiced without these specific details. In other instances, well-known methods, procedures, and components have not been described in detail so as not to obscure the present invention.

An embodiment of the invention may be referred to in this document as Dynamic Spectral Shaping (DSS). DSS may allow a user to effectively implement "spectral politeness" or "spectral friendliness", e.g., by allowing a lower spectral energy of a transmitted high-speed service to a minimum required for sustaining a stable broadband link. As a result, spectral interference from DSS-enabled services to other services operating in the same or adjacent cable binders may be significantly reduced compared to non-DSS-enabled services operating at the same, or similar, bitrate.

FIG. 1 may be referred to in order to illustrate an exemplary system topology 100 in accordance with embodiments of the present invention in non-repeatered bonded links.

Referring to FIG. 1, a communication system 100 may include a central office (CO) location 101, which may include a network terminal (NT) 170 and a Digital Subscriber Line Access Multiplexer (DSLAM) 155. The NT 170 may communicate data to a remote terminal (RT) 125, at a remote location, over a plurality of copper pair communication links 175. In the schematic depiction of FIG. 1, eight communication links 175 are shown, wherein each pair of links, i.e., each two copper pairs, communicate between the NT 170 and the RT 125. It will be recognized that embodiments of the present invention may include fewer than eight or more than eight copper pairs communicating between the NT and the RT. A portion of the communication links may be located in a binder 160 before the copper pairs diverge to the remote terminal 125. Digital Subscriber Line Access Multiplexer (DSLAM) 155 may also be located in CO 101 and may be used to provide a connection between multiple digital subscriber lines to a network via multiplexing techniques to a plurality of customers who may have DSL Customer Premise Equipment (CPE) 165 installed at their respective customer premises. A portion of the communication links to CPE 165 may be located in a binder 160 together with a portion of copper pairs to remote terminals 125. NT 170 may include one or more processors or processing units to assess and/or monitor one or more parameters of system 100 or its sub-systems. These parameters may be, for example, data traffic conditions, signal-to-noise ratio (SNR) margin on each of one or more of the communication links, data rates on each of one or more of the communication links, or other performance parameters. NT 170 may also determine, monitor and/or control transmission characteristics for each of the communication links, including bitrate, symbol rate, constellation size, or power transmission level. For example, as described in further detail below, NT 170 may include a processor to determine a system parameter, such as bitrate, monitor transmission performance in each communication link, e.g., SNR margin, and control transmission characteristics, e.g., constellation size and power transmission level on each communication link.

A method of spectral shaping may be applied in cases where the Digital Subscriber Loop (DSL) technology being used may allow an adjustment of the shape of its transmitted power spectral density (PSD). The shape of the PSD transmitted by an SHDSL modem is primarily determined by the symbol rate used by the modem, wherein a higher symbol rate results in a PSD that extends to proportionally higher frequencies and therefore uses a wider spectrum band.

Therefore, one method of reducing spectral interference of SHDSL modems to other services may be to reduce their bitrate, which also may reduce their symbol rate. However, this simple approach may not take into account situations in which an SHDSL modem may be operating with excess SNR (Signal-to-Noise Ratio) margin, i.e., with SNR margin higher than a desired SNR margin specified by a user. Accordingly, in such situations, there may be additional methods of reducing spectral impact in accordance with the present invention.

A first method in accordance with some embodiments of the present invention for reducing spectral impact may be dynamically or adaptively increasing a constellation size, i.e., a number of data bits that may be transmitted in each symbol. For example, using the TC-PAM 16 constellation may result in a transmission of 3 data bits per symbol, while using the TC-PAM 32 constellation may result in a transmission of 4 data bits per symbol. Since a bitrate may be defined as a symbol rate times a number of bits per symbol, this means that, for a same bitrate, TC-PAM 32 may utilize 75% (¾) of a symbol rate, and therefore 75% of a frequency band, of TC-PAM 16. Therefore, for a given bitrate, if a modem has enough excess SNR margin, for example 2-4 dB, to increase its constellation size from, for example, TC-PAM 16 to TC-PAM 32, then its symbol rate, and therefore a frequency band in which it may generate spectral interference, may decrease by 25% without a loss in bitrate.

A second method in accordance with some embodiments of the present invention for reducing spectral impact may be to dynamically or adaptively reduce a transmit power level of a modem by applying power back-off (PBO). For example, if a modem is operating with 9 dB of SNR margin, while a user may have requested at least 6 dB of SNR margin, then a PBO of 3 dB may be applied to lower a transmitted power spectral density (PSD) level of a modem, thereby reducing its spectral impact on other services correspondingly by 3 dB.

In some embodiments of the invention, spectral impact may be reduced by combining optimization of constellation size and transmit power.

Figure 2:
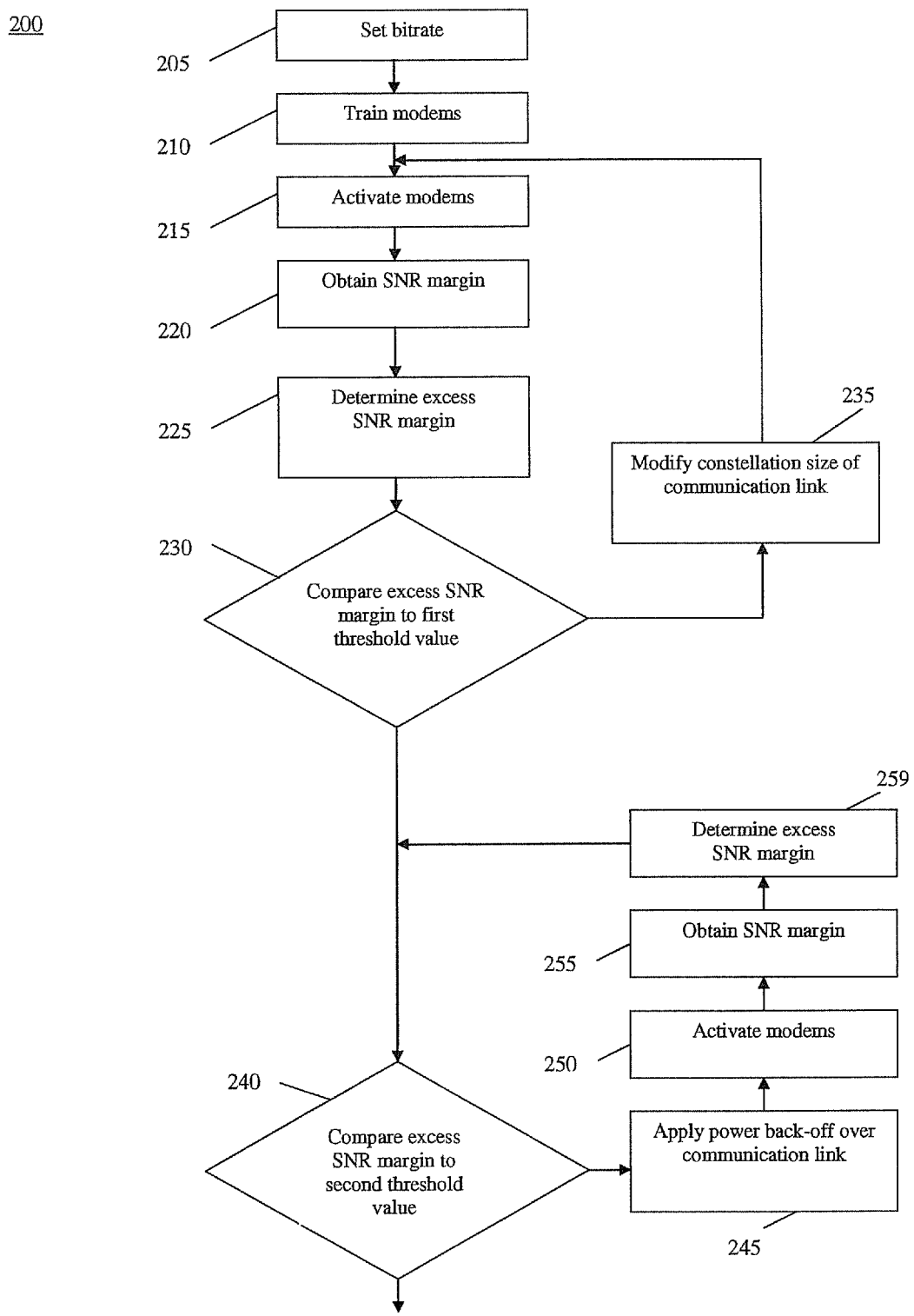
FIG. 2 is a flow diagram illustrating an embodiment of a dynamic spectral shaping (DSS) method according to the present invention.

Reference is made to FIG. 2, which shows one embodiment of the present invention of a DSS method 200 for SHDSL-based systems. A bitrate may be predetermined (block 205), where the predetermined bitrate may be a desired bitrate, which may be specified by a user, or a maximum achievable bitrate, or the lower of the two bitrates. Modems in a bonded copper link may be trained (block 210) to achieve the predetermined bitrate for the bonded link, and activated (block 215). SNR margin may be obtained (block 220) on one or more modem receivers. An excess SNR margin of some or all of the modem receivers may be determined, for example, by subtracting a desired SNR margin specified, for example, by a user, from an SNR margin of some or all of the modem receivers (block 225).

A comparison may be made between the excess SNR margin and a threshold value (block 230), and based on this comparison, the constellation size may be modified (block 235), e.g., increased or decreased to next available constellation size. For example, a determination may be made for some or all of the modem receivers whose excess SNR margin that may be calculated whether it is greater than a first predetermined threshold value for excess SNR margin, for example 4 dB. If the excess SNR is greater than the first threshold value, then a constellation size of a modem receiver and a corresponding modem transmitter connected to another end of a same copper pair may be increased to a next greater available constellation size. Such an increase in constellation size may be, for example, from TC-PAM 4 to TC-PAM 8, or from TC-PAM 8 to TC-PAM 16, or from TC-PAM 16 to TC-PAM 32, or from TC-PAM 32 to TC-PAM 64, or from TC-PAM 64 to TC-PAM 128, or from TC-PAM 128 to TC-PAM 256, etc. In some embodiments of the invention, if the excess SNR margin is not greater than the first threshold value, then the constellation size may be decreased to a next lower available constellation size, for example, in the reverse order of the TC-PAM constellations listed above.

After modification of constellation size (block 235), the modems may be re-activated (block 215), and an SNR margin of some or all of the modem receivers may be re-obtained (block 220). The process may repeat, and constellation size modified, until the loop condition of block 230 is not satisfied. For example, if the method loops to increase constellation size if the excess SNR margin is greater than a threshold value, then the loop may cease when the excess SNR margin is not greater than the threshold, or when the greatest available constellation size has been reached. Then, for modem receivers that have excess SNR margin available, for example, greater than a second threshold value for excess SNR margin, for example 1 dB (block 240), power back-off (PBO) may be applied to a corresponding modem transmitter that may be connected to another end of a same copper pair (block 245) to reduce the transmission power of the modem transmitter. A PBO value may be a predetermined value and may based on excess SNR margin, where this PBO value may be less than or equal to an excess SNR margin of a corresponding modem receiver. Then, the modems may be re-activated (block 250), an SNR margin may be re-obtained (block 255), determination of excess SNR margin made (block 259), and the excess SNR margin may be compared to the threshold value (block 240), until none of the some or all modem receivers have excess SNR margin.

Variations and modifications of the method shown in FIG. 2 may be implemented in accordance with the present invention. For example, in some embodiments of the invention, a number of TC-PAM constellation sizes may be limited, for example, if some modems do not support certain constellation sizes that may be available for other modems. In such embodiments, block 235 may only modify constellation size until the maximum or minimum suitable constellation size is reached for that modem.

In some embodiments of the invention, the number of TC-PAM constellation sizes may be limited to one. In such embodiments, blocks 230 and 235 may be substantially eliminated for that modem, and the method may apply only the loop comprising blocks 240, 245, 250, 255, and 259 to that modem receiver, to obtain an optimized transmission power for the corresponding modem transmitter with respect to the desired SNR margin, by reducing excess SNR margin of the modem receiver in exchange for lower transmission power of the corresponding modem transmitter via power back-off.

In some embodiments of the invention, the transmission power may be substantially fixed for some modems. For example, two modems connected to two ends of a copper pair may be restricted to use a same PBO value based on local regulations that dictate use of a fixed PBO value. Accordingly, in such embodiments, blocks 240, 245, 250, 255 and 259 may be substantially eliminated, and the method may apply only the loop comprising blocks 230, 235, 215, 220 and 225, to obtain an optimized constellation size with respect to the desired SNR, for example, by reducing excess SNR margin of a modem receiver in exchange for larger constellation size, and hence narrower frequency band usage by the corresponding modem transmitter.

In some embodiments of the invention, an amount of excess SNR margin that may be used for determining if a constellation size may be increased, may be set by a predetermined threshold, for example 3 dB or 6 dB. This threshold may be set for a given system or it may be varied during an operation of a system.

It will be recognized that the constellation size and transmission power optimization loops may be interchanged in order of operation. Thus, in some embodiments of the invention, as shown in FIG. 2, constellation size may be optimized first (e.g., blocks 215, 220, 225, 230 and 235 may be repeated, and constellation size increased until no modems may have enough excess SNR margin to allow for further increase of constellation sizes), before moving to optimization of transmission power (e.g., blocks 240, 245, 250, 255 and 259). However, it will be recognized that in some embodiments of the invention, transmission power may be optimized first (e.g., blocks 240, 245, 250, 255 and 259 may be repeated until each modem may have no excess SNR margin, or may have reached a maximum PBO level, for example 20 dB), before moving to optimization of constellation size (e.g., blocks 215, 220, 225, 230 and 235). For example, in some embodiments, power back-off may be applied to a modem transmitter, and then, if appropriate, constellation size may be decreased in order to increase excess SNR margin of the corresponding modem receiver, and then additional power back-off may be applied to the modem transmitter.

In some embodiments of the invention, there may be limitations on the number of iterations on any particular loop. For example, block 240 (and the associated loop) may be repeated only up to a predetermined maximum number of iterations, for example three iterations or four iterations. In another example, block 230 (and the associated loop) may be repeated only up to a predetermined maximum number of iterations, for example three iterations or four iterations.

It will be recognized that the present invention includes the combination of any or all of the features in the above embodiments, as suitable.

The method of FIG. 2 may refer to bonded copper links, in which application of DSS may be highly useful; however, it will be recognized that the method of FIG. 2 may be applied to a link comprised of a single copper pair. In addition, many other embodiments of the present invention may implement the same concept in different ways. Some modifications that may result in other embodiments are described below.

Figure 3:
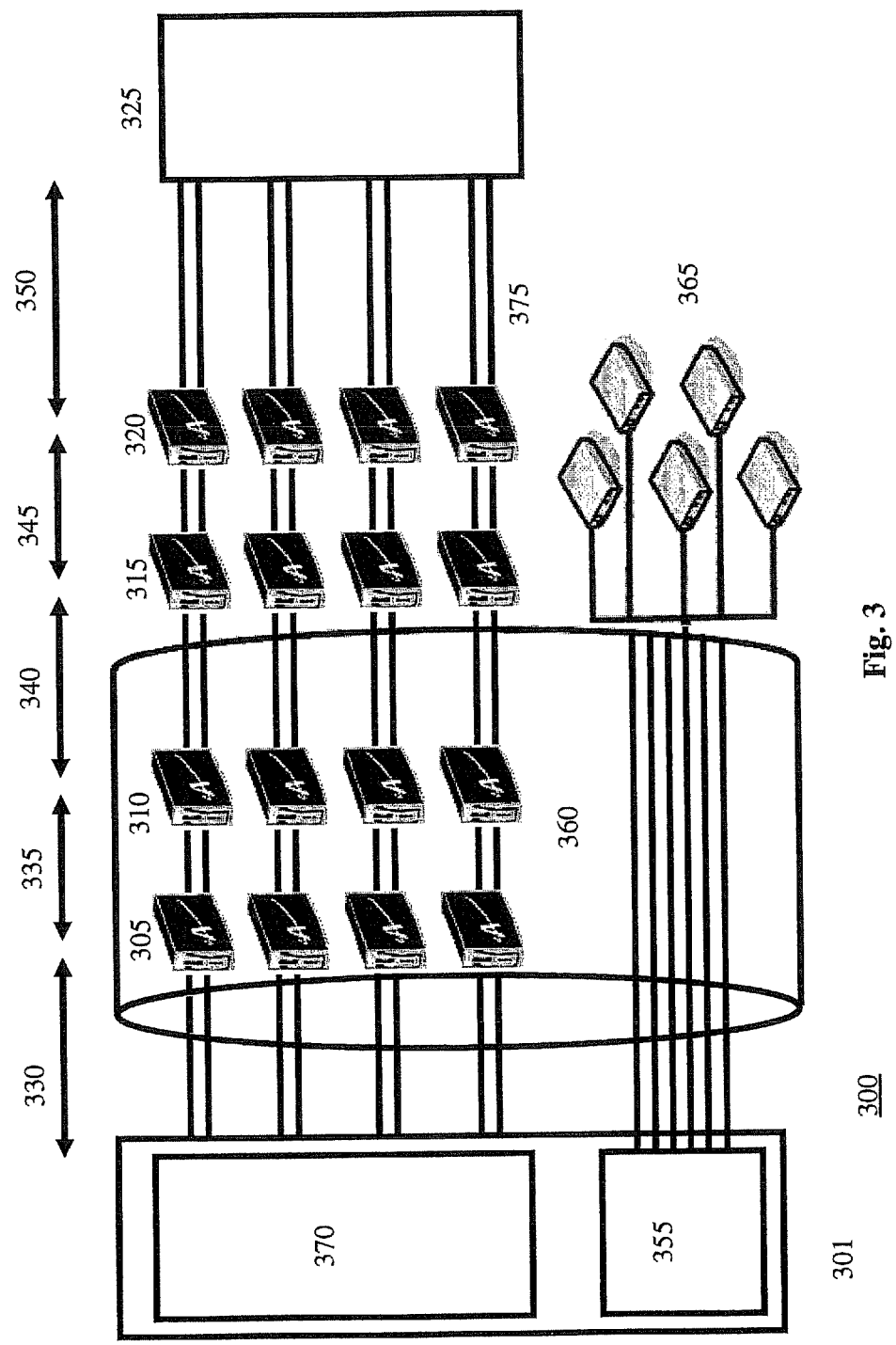
FIG. 3 is a block diagram illustrating a system topology according to embodiments of the present invention.

Referring to FIG. 3, a communication system 300 may include a central office (CO) location 301, which may include a network terminal (NT) 370 and a Digital Subscriber Line Access Multiplexer (DSLAM) 355. The NT 370 may communicate data to a remote terminal (RT) 325, at a remote location, over a plurality of copper pair communication links 375. In the schematic depiction of FIG. 3, eight communication links are shown, wherein each pair of links, i.e., each two copper pairs, communicate between NT 370 and RT 325. It will be recognized that embodiments of the present invention may include fewer than eight or more than eight copper pairs communicating between the CO and the RT.

In a repeated system, as depicted in FIG. 3, each communication link 375 includes a plurality of link segments, wherein link segments are connected to each other by repeaters. Thus, in the schematic depiction of FIG. 3, eight links 375 are shown, each link comprising five link segments 330, 335, 340, 345 and 350, respectively, each of the link segments connected to another link segment by a repeater. Thus, as shown schematically, each of the links includes four repeaters, at each of repeater locations 305, 310, 315 and 320, respectively. It will be recognized that some repeaters may connect more than one link segment. Thus, for example, in the embodiment shown in FIG. 3, each repeater may be connected to two links 375.

A portion of the communication links may be located in a binder 360 before the copper pairs branch off to another binder connected to RT 325. Digital Subscriber Line Access Multiplexer (DSLAM) 355 may also be located in CO 301 and may be used to provide a connection between multiple digital subscriber lines to a network via multiplexing techniques to one or more customers who may have DSL Customer Premise Equipment (CPE) 365. A portion of the communication links to CPE 365 may be located in a binder 360 together with a portion of communication links to RT 325.

In the schematic example of FIG. 3, link segments 330, 335 and a portion of link segment 340, may be located in a binder 360, together with one or more DSL services, and these residential DSL services may then branch off to separate binders after segment 340, where the branches may then reach residential customers with CPE 365. RT 325 may include equipment for terminal access to transmitting and/or receiving high-speed digital services. CPE 365 may also include terminal access to transmitting and/or receiving high-speed digital services. Between each link segment of the bonded communication link between NT 370 and RT 325 there may be repeaters 305, 310, 315 and 320, respectively, at each respective repeater location.

NT 370 may include one or more processors or processing units to assess and/or monitor one or more parameters of system 300 or its sub-systems. These parameters may be, for example, data traffic conditions, signal-to-noise ratios on some or all of the modem receivers of the respective communication links, data rates of some or all of the communication links or communication link segments, or other performance parameters. NT 370 may also determine, monitor and/or control transmission characteristics for some or all communication links or segments thereof, including bitrate, symbol rate, constellation size, or power transmission level. NT 370 may also determine, monitor and/or control transmission characteristics, particularly constellation size and power transmission level, for some or all link segments individually, and may communicate such transmission characteristic instructions to repeaters by various protocols. For example, during training, NT 370 may communicate the repeaters' transmission characteristics via handshake protocol. For example, during runtime activation, NT 370 may communicate the repeaters' transmission characteristics through the Embedded Operations Channel (EOC). For example, as described in further detail below, NT 370 may include a processor to determine a system parameter, such as bitrate, monitor transmission performance in some or all link segments of at least one of the communication links, and control transmission characteristics, e.g., constellation size and/or power transmission level, for some or all of those link segments. The repeaters may communicate with NT 370 by sending and/or receiving signals via a control channel that may be transmitted over the communication links. The repeaters may relay control channel information to and from other repeaters, for example, repeater 310 may convey control channel information from NT 370 to repeater 315, which may further relay some control channel information to repeater 320, thus enabling communication between NT 370 and remotely located repeater 320.

In a repeated system, spectral interference may be generated by a repeated link into residential DSL services, which may be determined primarily (a) for the upstream direction, by SHDSL transmitters at a CO, since those transmitters may be located closest to upstream residential DSL receivers in the same CO and may share a cable binder over an initial segment; and/or (b) for the downstream direction, by SHDSL transmitters of repeaters connected to pairs in a same cable binder and located further away from a CO, since those transmitters may be located closest to downstream residential DSL receivers at customer premises locations. For example, referring to the schematic illustration of FIG. 3, in an upstream direction of residential DSL services, SHDSL transmitters at NT 370 may generate spectral interference, since those transmitters may be located closest to upstream residential DSL receivers in DSLAM 355, and may share a same cable binder 360 over an initial segment 330. Referring again to the schematic illustration of FIG. 3, in a downstream direction of residential DSL services, SHDSL transmitters at repeaters 315 may generate spectral interference, since they may be located closest to residential DSL receivers in CPE 365 at customer premises locations.

It will be recognized that segments in a repeated system may have different lengths, and therefore, different capacities and different crosstalk couplings between copper pairs. Thus, for example, referring again to FIG. 3, segment 340 may be shorter than either or both of segments 330 and 335, while segment 330 may be shorter than segment 335, and segment 350 may be a longest of all five segments.

Also, SHDSL receivers at NT 370 may be exposed to a greater interference noise environment, because they may be located closest to downstream residential DSL transmitters in DSLAM 355, and may share a same cable binder 360 over segment 330. Different segment lengths and different noise environments on different segments may result with SHDSL modems on segment 340 being able to achieve a higher maximum bitrate than modems that are connected to segment 330 and segment 335. A limiting factor in terms of a maximum achievable bitrate may be the longest link segment in each link, because the capacity of copper pairs decreases significantly as their length increases. Thus, in the example of FIG. 3, link segment 350 may be the longest of all five segments, and therefore, its capacity may determine the maximum bitrate of the entire link.

Referring again to FIG. 3, consider a case where a maximum achievable bitrate on the longest link segment, e.g., segment 350, is 2.5 Mbps per pair, which results in a maximum bitrate for the entire link of 20 Mbps over all eight copper pairs 375. An application of DSS on this repeatered link system may result in a significant reduction of SHDSL spectral energy on segments 330, 335 and 340, respectively, and thus in a significant reduction of a repeatered link's spectral impact on residential DSL receivers in DSLAM 355 and in CPE 365.

It will now be recognized that in some embodiments of the invention, the method of FIG. 2 (or any variation thereof) may be applied to a repeatered system, in which one, some or all communication links from the CO may comprise a plurality of link segments connected in serial, and at least one repeater receiving a signal on a first link segment of the communication link at a receiving end, and transmitting the signal on a second link segment of the communication link at a transmitting end. One way of implementing the method of FIG. 2 in a repeatered system may be to regard the entirety of each repeatered link as a whole, analogously to each communication link in FIG. 1. Alternately, some or all steps of the method of FIG. 2 may be applied to each link segment in the repeatered system individually, as described further below with reference to FIGS. 4A and 4B.

Figure 4A:
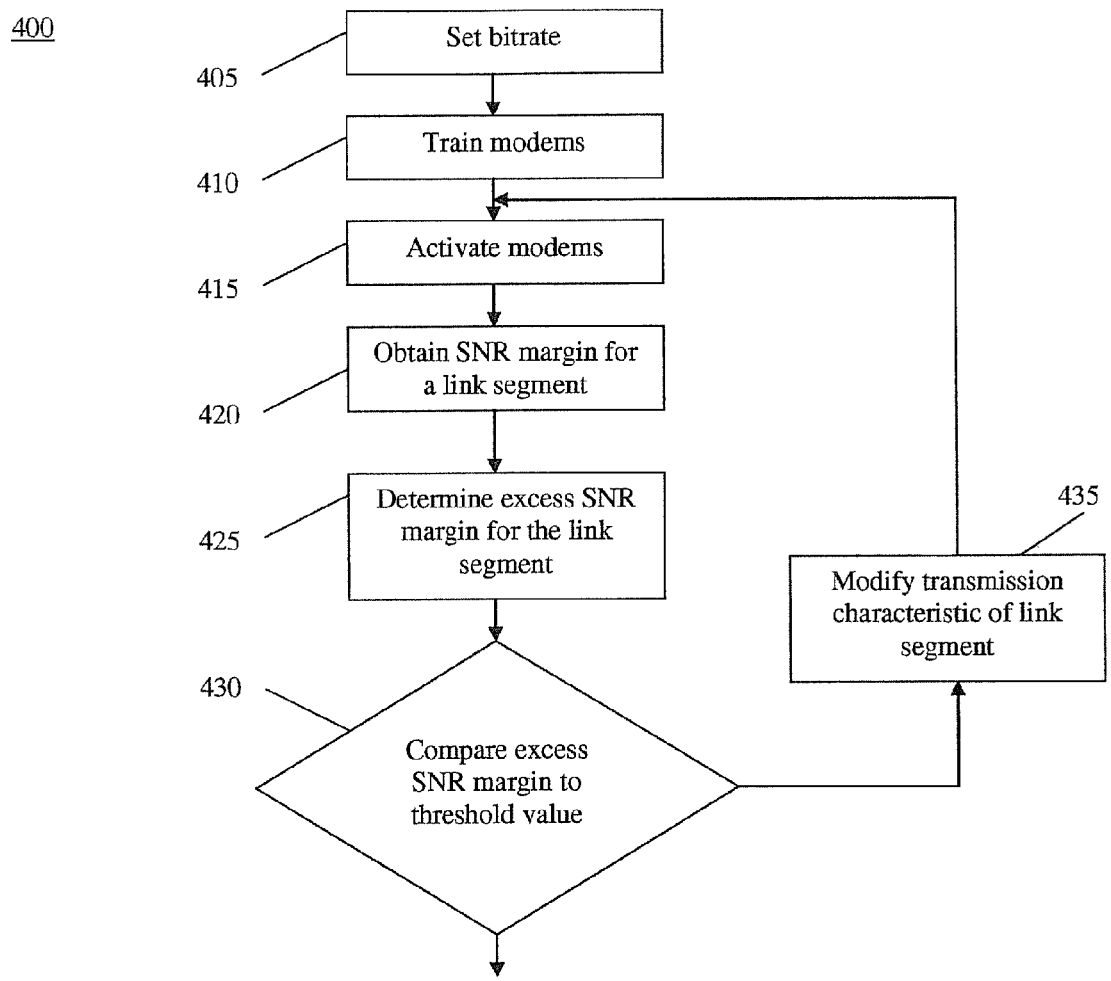
FIGS. 4A and 4B are flow diagrams illustrating DSS methods for a repeatered SHDSL system in accordance with embodiments of the present invention.

Reference is made to FIG. 4A, which is a flow diagram of a DSS method 400 in accordance with some embodiments of the present invention, applied to a repeatered SHDSL system. A bitrate may be predetermined (block 405), where the predetermined bitrate may be a desired bitrate, which may be specified by a user, or a maximum achievable bitrate, or the lower of the two bitrates. The modems may be trained (block 410) to achieve the predetermined bitrate, and activated (block 415).

In some embodiment of the invention, during the training stage (block 410), the modems may be trained using each constellation size selected from a predetermined set of available constellation sizes. Suitable constellation sizes may be, for example, TC-PAM 4, TC-PAM 8, TC-PAM 16, TC-PAM 32, TC-PAM 128, or TC-PAM 256, etc. Modems may be trained by using a same constellation for all modems in a link. A bitrate selected at block 405 may be used during training. When each available constellation has been used to train the modems, a constellation may be selected to achieve a desired bitrate, and the modems activated at the selected constellation size (block 415). If more than one constellation may achieve the desired bitrate, then a constellation may be selected, for example, according to predetermined criteria. One example of such criteria may be an order of preference, e.g., TC-PAM 32, then TC-PAM 16, then TC-PAM 64, then TC-PAM 8, then TC-PAM 4, then TC-PAM 128, then TC-PAM 256. Other orders of preference may be applicable as well, and may be derived from a particular system configuration or equipment use. For example, if a primary objective is to reduce interference to downstream ADSL, then the order of preference may be to use the highest available constellation size. For example, if a primary objective is to reduce interference to upstream ADSL, then the order of preference may be to use the lowest available constellation size. In such an embodiment, as described below, the transmission characteristic optimized in loop 430 may be transmission power. Thus, after training the modems using each of the available constellation sizes (block 410) and activating the modems at a selected constellation size (block 415), upon determination of excess SNR margin, power back-off may be applied (block 435) repeatedly, for example, until there is no remaining excess SNR margin or until another terminal condition is reached.

Upon activation of the modems, an SNR margin of some or all modem receivers in the link segments may be obtained (block 420). An excess SNR margin may be determined for some or all segment links, for example, by subtracting a desired SNR margin from the SNR margin obtained from each modem receiver (block 425). A determination may be made whether each modem receiver may have available excess SNR margin, for example, by comparing the excess SNR margin to a threshold value (block 430). In some embodiments, for each modem receiver that has an excess SNR margin, a transmission characteristic of the link segment may be modified (block 435). An example of transmission characteristics that may be modified is transmission power.

For each modem receiver that may have an excess SNR margin, PBO may be applied to a corresponding modem transmitter that may be connected to an opposite end of a same copper pair (block 435). A PBO value may be less than or equal to an excess SNR margin of a corresponding modem receiver. After PBO is applied, the corresponding modem may be activated again (block 415), an excess SNR margin of the modem may be determined again (block 425), and the process may be repeated until the modem has no more excess SNR margin.

It will be recognized that block 430 may loop a number of times until a stop condition is reached, for example, excess SNR margin is not greater than the threshold value, or a terminal (i.e., maximum or minimum) value for the transmission characteristic has been reached.

It will be recognized that while the method of FIG. 4A refers to a repeatered bonded copper link that includes multiple copper pairs, each with multiple segments, the same method may be applied within the scope of the present invention to communication links that involve only one copper pair and have no repeaters.

Figure 4B:
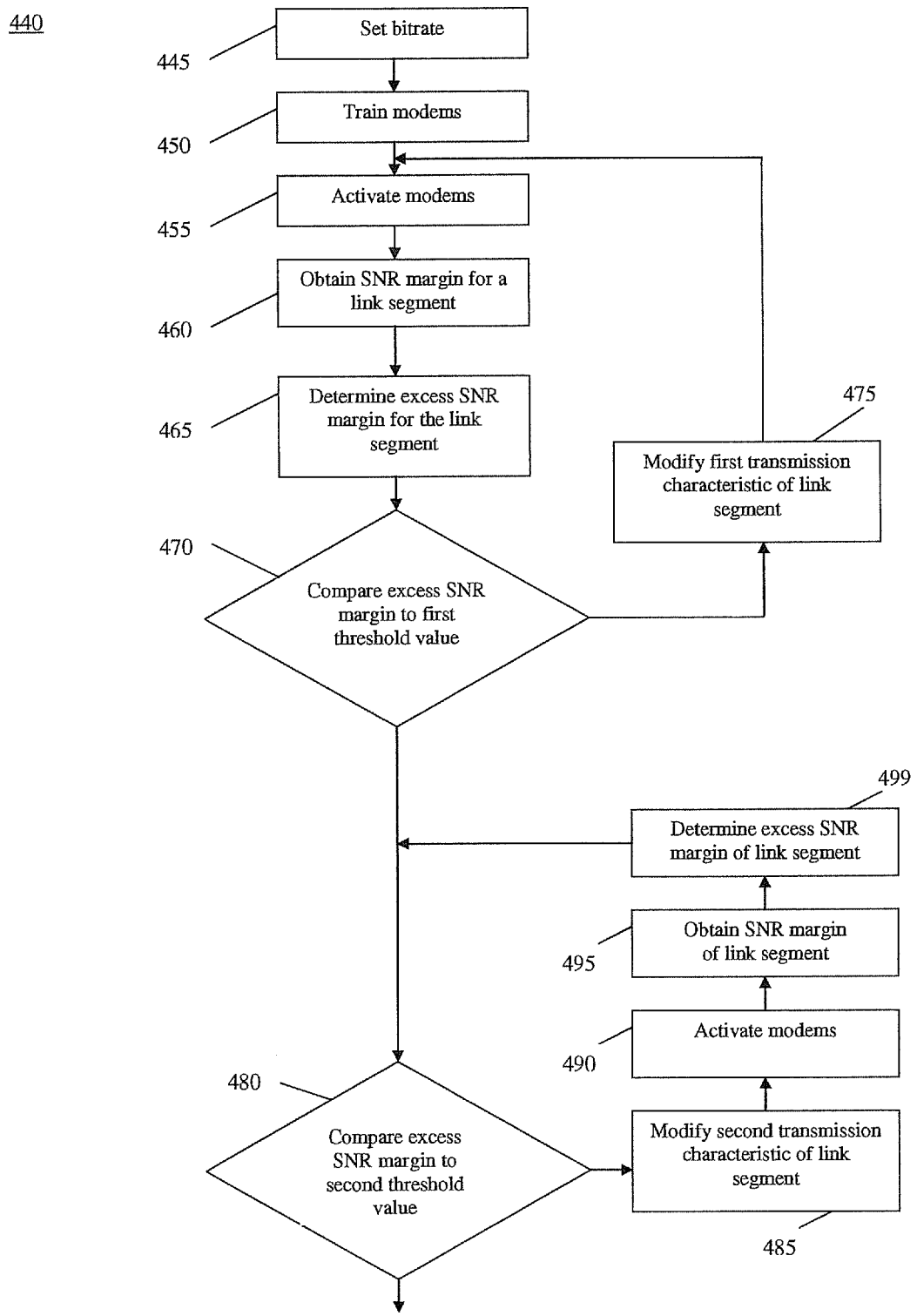

Reference is made to FIG. 4B, which is a flow diagram of a DSS method 440 in accordance with some embodiments of the present invention, applied to a repeatered SHDSL system. A bitrate may be predetermined (block 445), where the predetermined bitrate may be a desired bitrate, which may be specified by a user, or a maximum achievable bitrate, or the lower of the two bitrates. The modems may be trained (block 450) to achieve the predetermined bitrate for the bonded link, and activated (block 455).

Upon activation, an SNR margin of some or all modem receivers in the link segments may be obtained (block 460). An excess SNR margin may be determined for some or all segment links, for example, by subtracting a desired SNR margin from the SNR margin obtained from each modem receiver (block 465). A determination may be made whether each modem receiver may have available excess SNR margin, for example, by comparing the excess SNR margin to a first threshold value (block 470). It will be recognized that in some embodiments, the determination may be whether excess SNR margin is greater than a threshold value, while in other embodiments, the determination may be whether excess SNR margin is less than a threshold value. For each modem receiver, a first transmission characteristic of the link segment may be modified based on the comparison of excess SNR margin to the first threshold value. Thus, in some embodiments, for each modem receiver that has an excess SNR margin, a first transmission characteristic of the link segment may be modified (block 475). When a termination condition of loop 470 has been reached, e.g., excess SNR margin is not greater than the first threshold value, or the first transmission characteristic has reached a terminal value, then a second transmission characteristic may be optimized. A determination may be made whether the modem receiver has available excess SNR margin, for example, by comparing the excess SNR margin to a second threshold value (block 480). For each modem receiver, a second transmission characteristic of the link segment may be modified based on the comparison of excess SNR margin to the second threshold value. Thus, in some embodiments, for each modem receiver that has an excess SNR margin, a second transmission characteristic of the modem receiver may be modified (block 485). The modem receivers may be reactivated (block 490), and an SNR margin for some or all of the modem receivers may be re-obtained (block 495) and the excess SNR margin of the link segment determined (block 499), and the second transmission characteristic may be modified until a terminal condition of loop 480 is reached.

Two examples of transmission characteristics that may be modified are constellation size, or transmission power. That is, in some embodiments of the invention, the first transmission characteristic may be constellation size, and the second transmission characteristic may be transmission power. In another embodiment of the invention, the first transmission characteristic may be transmission power, and the second transmission characteristic may be constellation size.

For example, in the case of constellation size as the transmission characteristic, a determination may be made whether the excess SNR margin of the link segment is greater than a first predetermined threshold value for the excess SNR margin, for example 4 dB. If the excess SNR is greater than the threshold value, then a constellation size of a modem receiver and a corresponding modem transmitter connected the opposite end of a same link segment may be modified, for example, increased to a next greater available constellation size. Such an increase in constellation size may be, for example, from TC-PAM 4 to TC-PAM 8, or from TC-PAM 8 to TC-PAM 16, or from TC-PAM 16 to TC-PAM 32, or from TC-PAM 32 to TC-PAM 64, or from TC-PAM 64 to TC-PAM 128, or from TC-PAM 128 to TC-PAM 256, etc. In some embodiments of the invention, the comparison may determine that if the excess SNR margin is not greater than the first threshold value, then the constellation size may be decreased to a next lower available constellation size, for example, in the reverse order of the TC-PAM constellations listed above.

Taking transmission power as the modified transmission characteristic, in one embodiment of the invention, upon determination that excess SNR margin is greater than a threshold value, transmission power may be modified, for example, by applying power back-off to a corresponding modem transmitter that may be connected to an opposite end of a same copper pair.

It will be recognized that while the method of FIG. 4B refers to a repeatered bonded copper link that includes multiple copper pairs, each with multiple segments, the same method may be applied within the scope of the present invention to communication links that involve only one copper pair and have no repeaters.

Variations and modifications of the methods shown in FIGS. 4A and 4B may be implemented in accordance with the present invention. For example, in some embodiments of the invention, a number of TC-PAM constellation sizes may be limited, for example, if some modems do not support certain constellation sizes that may be available for other modems. In such embodiments, the relevant transmission characteristic modification blocks may only modify constellation size until the maximum (or minimum) suitable constellation size is reached for that modem.

In some embodiments of the invention, the number of TC-PAM constellation sizes may be limited to one for some link segments. In such embodiments, for those link segments, the blocks relevant to modification of constellation size may be substantially eliminated for that modem, and the method may modify only the transmission power, for example, using power back-off to the modem transmitter based on the excess SNR margin of the corresponding modem receiver.

In some embodiments of the invention, the transmission power may be substantially fixed for some modems. For example, two modems connected to two ends of a copper pair may be restricted to use a same PBO value based on local regulations that dictate use of a fixed PBO value. Accordingly, in such embodiments, blocks relating to transmission power optimization may substantially eliminated for that modem, and the transmission power for that modem may be a fixed transmission power, may follow the transmission power determined for the link segment preceding the modem.

In some embodiments of the invention, an amount of excess SNR margin that may be used for determining whether a constellation size may be modified, may be set by a predetermined threshold, for example 3 dB or 6 dB. This threshold may be set for a given system or it may be varied during an operation of a system.

In some embodiments of the invention, there may be limitations on the number of iterations on any particular loop. For example, blocks 430, 470, or 480 (and their associated loops) may be repeated only up to a predetermined maximum number of iterations, for example three iterations or four iterations.

It will be recognized that the present invention includes the combination of any or all of the features in the above embodiments, as suitable.

In some embodiments of the invention, frequency bands that may be used by receivers of residential DSL services may be benefited by a use of DSS. Since one purpose of DSS may be to reduce spectral interference to residential DSL services, it may be advantageous to consider frequency bands that may be used by receivers of those services. A large number of residential DSL services today may use asymmetric non-overlapping frequency plans, according to which upstream and downstream transmitters may use different frequency bands, thereby ensuring that there may be little crosstalk generated from their upstream transmitters to nearby downstream receivers and from downstream transmitters to nearby upstream receivers of a same type of DSL service.

The asymmetric nature of residential DSL services may be exploited by another embodiment of the present invention, and may improve DSS with SHDSL modems that may use asymmetric symbol rates, and/or asymmetric constellations, and/or asymmetric PBO values. An asymmetric DSS method may be used, for example, in a communications link that may use a single copper pair that may be connected to a SHDSL modem on each end, and may be deployed in a binder of copper pairs that may also carry asymmetric residential DSL services. For example, this pair may support a symmetric bitrate of 5 Mbps and may use a TC-PAM 64 constellation, which may transmit 5 bits per symbol, and a symbol rate of 1 MHz in both an upstream and a downstream direction. When considering a spectral impact of this SHDSL link on neighboring asymmetric DSL services, a main concern may typically be interference generated to downstream residential DSL receivers. If a user of an SHDSL link may also tolerate lower upstream throughput, then it may be possible to significantly reduce an impact of spectral interference of an SHDSL link on downstream residential DSL receivers, for example, by reducing an upstream bitrate of an SHDSL link.

In some embodiments of the invention, SHDSL modems may be capable of supporting asymmetric symbol rates, in which case, a user may reduce an upstream SHDSL bitrate to, for example, 3 Mbps. This may reduce an upstream symbol rate by, for example, 40% to 600 kHz. Spectral interference of a SHDSL link to downstream residential DSL receivers may be significantly reduced, since an upstream SHDSL transmitter may generate negligible spectral interference in, for example, frequencies above 400 kHz.

In some embodiments of the invention, SHDSL modems may be capable of supporting asymmetric constellations and asymmetric PBO, in which case, a user may again reduce an upstream SHDSL bitrate to, for example, 3 Mbps by using a lower constellation size in an upstream direction. This may be done, for example, by using a TC-PAM 16 constellation, which may transmit only 3 bits per symbol, thereby increasing an excess SNR margin on an upstream SHDSL receiver by approximately 12 dB. Therefore, an upstream PBO value may now be increased by 12 dB, and may result in a 12 dB reduction of a spectral interference level that may be generated by an upstream SHDSL transmitter to downstream residential DSL receivers.

Figure 5:
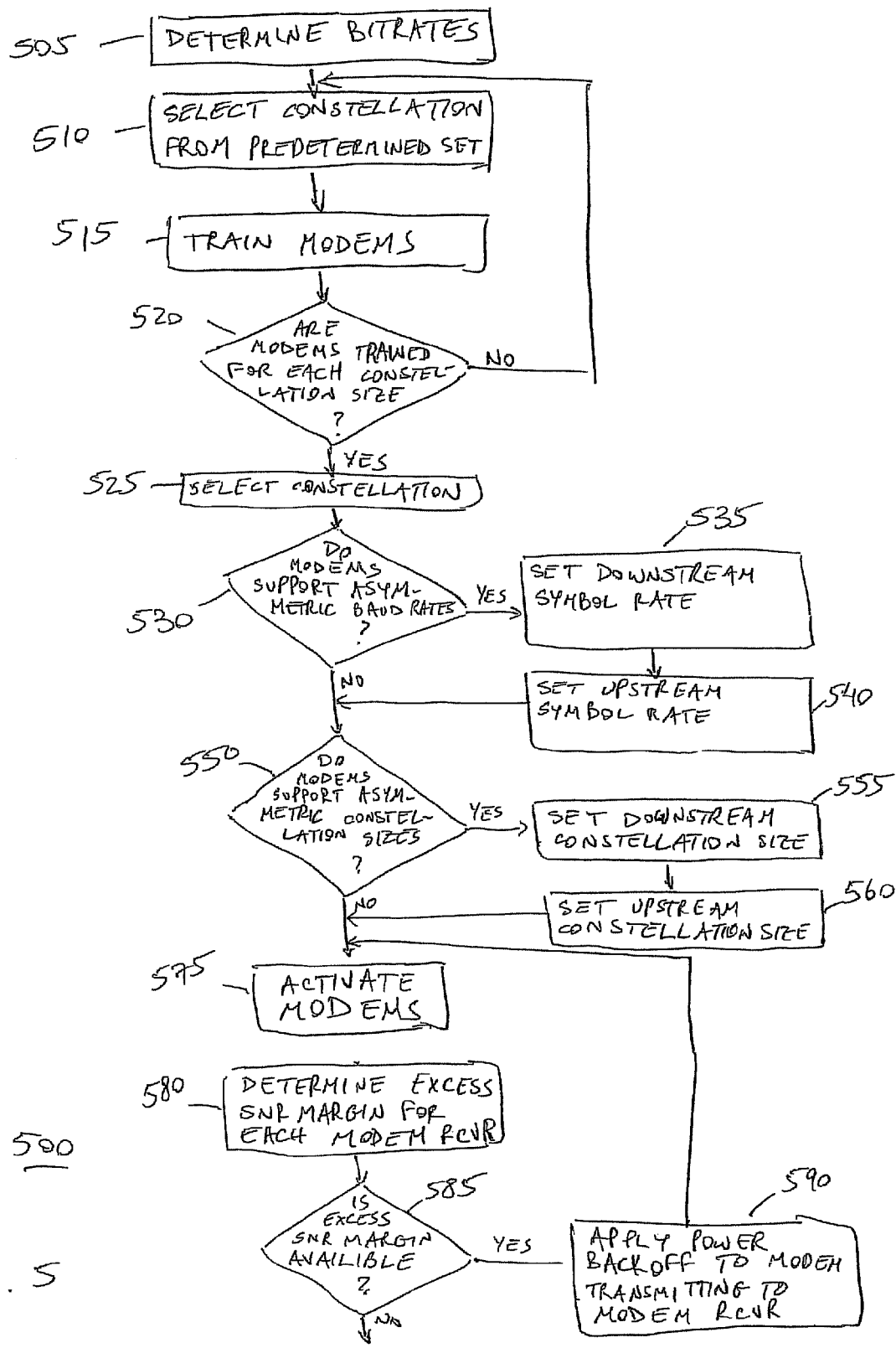
FIG. 5 is a flow diagram illustrating an asymmetric DSS method in accordance with embodiments of the present invention.

Reference is made to FIG. 5, which is a block diagram of a DSS method 500 applied to an asymmetric system. Bitrates may be determined (block 505), for example, where a desired upstream bitrate may be lower than a desired downstream bitrate. Additionally or alternatively, a minimum acceptable upstream-to-downstream bitrate ratio may be determined for a bonded copper link. A constellation may be selected from a predetermined set of available constellations (block 510). Available constellations may be, for example, TC-PAM 4, TC-PAM 8, TC-PAM 16, TC-PAM 32, TC-PAM 64, TC-PAM 128, or TC-PAM 256. Modems may be trained (block 515) in a bonded copper link using a same constellation for all modems in a link. A bitrate selected at block 505 may be used during training. A same constellation for all transmitters in a link may be used at a desired downstream bitrate that may be specified by a user or to a maximum bitrate that modems may reach using that constellation, whichever may be lower. A determination may be made whether each available constellation may have been used for training of modems (block 520). If an additional constellation or constellations may be available for training of modems, it may be selected, and the training repeated (blocks 510, 515). If a determination may be made that each available constellation has been used to train modems, a constellation may be selected (block 525) to achieve the desired bitrate. If more than one constellation may achieve a desired bitrate specified by a user or a same maximum bitrate, or other bitrate determination, then a constellation may be selected according to a predetermined criteria, for example by selecting a highest possible constellation size. A determination may be made whether the SHDSL modems support asymmetric baud rates (block 530). If so, a downstream symbol rate of each modem may be set (block 535) to that corresponding to the constellation size selected in block 525. An upstream symbol rate of each modem may be set (block 540) so that a ratio of upstream to downstream symbol rates may be equal to either a ratio of a desirable upstream to downstream link bitrate or a minimum acceptable upstream-to-downstream link bitrate ratio. A determination may be made whether SHDSL modems support asymmetric constellation sizes (block 550). If so, a downstream constellation size of each modem may be set (block 555) to a value selected in block 525. An upstream constellation size of each modem may be set (block 560) so that a ratio of upstream to downstream constellation sizes may have, for example, a lowest possible value that may be greater than or equal to either a ratio of desirable upstream to downstream link bitrates or a minimum acceptable upstream-to-downstream link bitrate ratio. Modems may be activated (block 575) using the determined upstream and downstream bitrates, symbol rates, and constellation sizes. An excess SNR margin of each modem receiver may be determined (block 580), for example, by subtracting a desired SNR margin that may be specified by a user from an SNR margin obtained for one or more modem receivers. A determination may be made whether the modem receivers may have available excess SNR margin (block 585), for example, whether the excess SNR margin is greater than a threshold value. For modem receivers that satisfy this criterion, power back-off may be applied to a corresponding modem transmitter connected to the other end of the same copper pair (block 590). A PBO value may be less than or equal to an excess SNR margin of a corresponding modem receiver. After PBO is applied, the modems may be re-activated (block 575) and an excess SNR margin of each modem receiver may again be determined (block 580), and the process may be repeated until there is no more excess SNR margin.

It will be recognized that the DSS method described above with reference to FIG. 5 in connection with a non-repeatered system such as depicted in FIG. 1 may advantageously be applicable to a repeatered link system such as depicted in FIG. 3, because repeatered links may often have higher excess SNR margin than non-repeatered links. One reason for this is that repeatered links may be composed of multiple segments, which may have different copper loop lengths and/or different copper wire gauges, and may be exposed to dramatically different interference noise environments. As a result, a maximum achievable bitrate on each of these segments may vary dramatically from one segment to the next, since that achievable bitrate may be determined by: (a) the strength of a main channel for a segment, which may be in turn determined by a copper wire gauge and a copper loop length, and (b) a level of interference noise on a segment. And since a maximum achievable bitrate for each repeatered copper pair may be equal to a lowest among maximum achievable bitrates for segments that may comprise a repeatered copper pair, it may be likely that some segments in a repeatered link may have a much higher excess SNR margin than other segments in a same repeatered link.

It will be recognized that in connection with application of FIG. 5 to a repeatered or non-repeatered system, after activation of the modems (block 575), the method may use any of the DSS methods described above, for example, in connection with FIGS. 2, 4A, and 4B. In particular, it will be recognized that the SNR margins may be separately obtained, and transmission characteristics separately modified with respect to upstream and downstream communication links or link segments, as applicable.

Variations on the method disclosed in connection with FIG. 5 are possible. For example, in some embodiments, the loop of blocks 530, 535, and 540 may be interchanged with the loop of blocks 550, 555, and 560. In another embodiment, a number of TC-PAM asymmetric constellation sizes may be limited, for example, if a modem may not support all constellation sizes that may be available. In some embodiments, for some communication links or link segments, symbol rates and not constellation sizes may be asymmetric, in which case, blocks 550, 555, and 560 may be eliminated. In some embodiments, for some communication links or link segments, only constellation sizes and not symbol rates may be asymmetric, in which case, blocks 530, 535, and 540 may be eliminated. In another embodiment, only asymmetric baud rates and asymmetric constellation sizes may be used, and transmission power may be symmetrical, in which case, blocks 585 and 590 may be eliminated, and any DSS method loop may be used. According to embodiments of the invention, any of the features in the above embodiments may be combined as suitable for any particular system or method.

Figure 6:
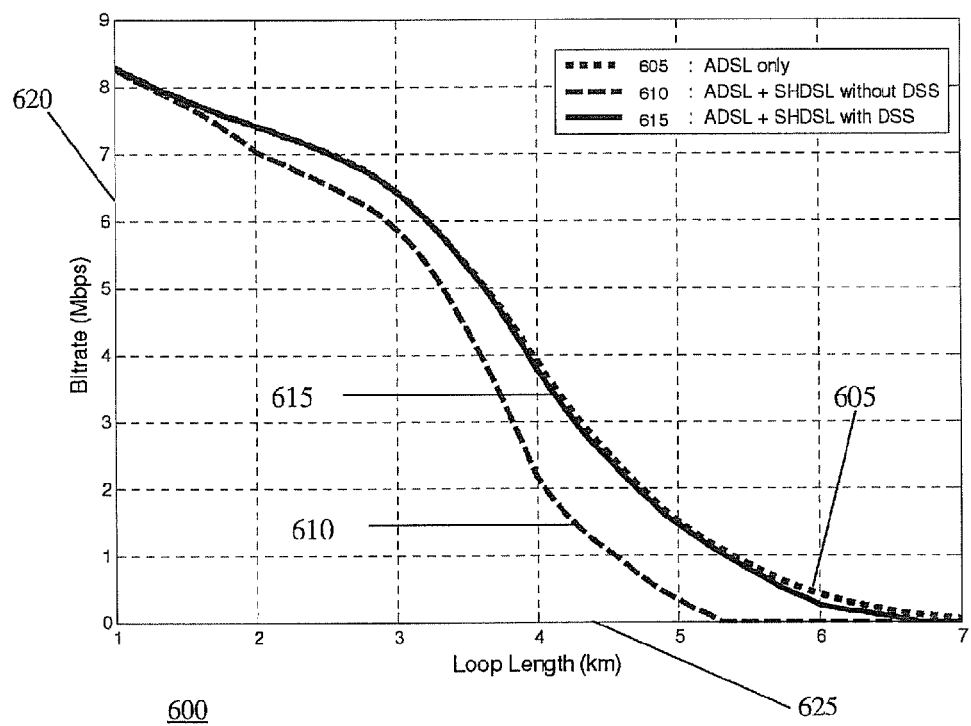
FIG. 6 is an exemplary graph illustrating ADSL performance using an embodiment of the invention.

FIG. 6 is a performance graph of an embodiment of the present invention, particularly relating to residential ADSL downstream performance, for example, associated with a repeatered system as depicted in FIG. 3. The graph of FIG. 6 depicts ADSL performance with repeatered SHDSL at 2.5 Mbps per copper pair. Vertical axis 620 represents bitrate in Mbps, and horizontal axis 625 represents loop length in kilometers. A first plot line 605 represents performance of ADSL only, e.g., without any SHDSL in a binder; a second plot line 610 represents ADSL and SHDSL without DSS, e.g., with 8 repeatered SHDSL pairs at 2.5 Mbps per pair without DSS; and a third line 615 represents ADSL and SHDSL with DSS, e.g., with 8 repeatered SHDSL pairs at 2.5 Mbps per pair with DSS. Three curves 605, 610 and 615 therefore represent a lowest downstream bitrate among, for example, five residential DSL services as a function of loop length, where loop length may be a length of a copper wire from a CO, e.g., DSLAM 355, to xDSL modems, e.g., modems 365.

Referring to FIG. 6, it will be recognized that a beneficial effect of DSS of an embodiment of the present invention may be seen by plot line 615, which shows performance only slightly lower than ADSL only (plot line 605) and significantly better than ADSL and SHDSL without DSS (plot line 610). Accordingly, by comparison of plot lines 615 against 605, it will be recognized that application of DSS may reduce a spectral impact of the repeatered SHDSL link (as distinguished from the fundamental spectral impact of the ADSL) to almost zero. In contrast, a same repeatered link system without DSS (plot line 610) may cause significant degradation of a downstream residential DSL bitrate, at, for example, a level of about 50% at 4 km, about 80% at 5 km, and 100% at 5.2 km and above.

Although the DSS method described above is with reference to repeatered bonded copper links, it will be recognized that a similar algorithm may be applied to a link comprised of a single repeatered copper pair.

According to an embodiment of the invention, the methods described above may be modified, by determining a bitrate and a constellation size of each modem as a function of an ambient noise environment. In particular, each receiver may measure a noise level it observes when all the transmitters in the bonded communications link are quiet, and may transmit these measurements back to a central DSS processing unit. Receivers that may have high noise levels may be likely to be more strongly coupled to other services in a binder. Therefore, those modems may be assigned a lower bitrate than modems with lower noise levels, while still maintaining an overall desired bitrate of a link. Modems with a lower assigned bitrate may also have an increased excess SNR margin, which may result in higher constellation sizes and/or higher PBO values, and thus may further decrease their spectral impact on neighboring services.

Figure 7:
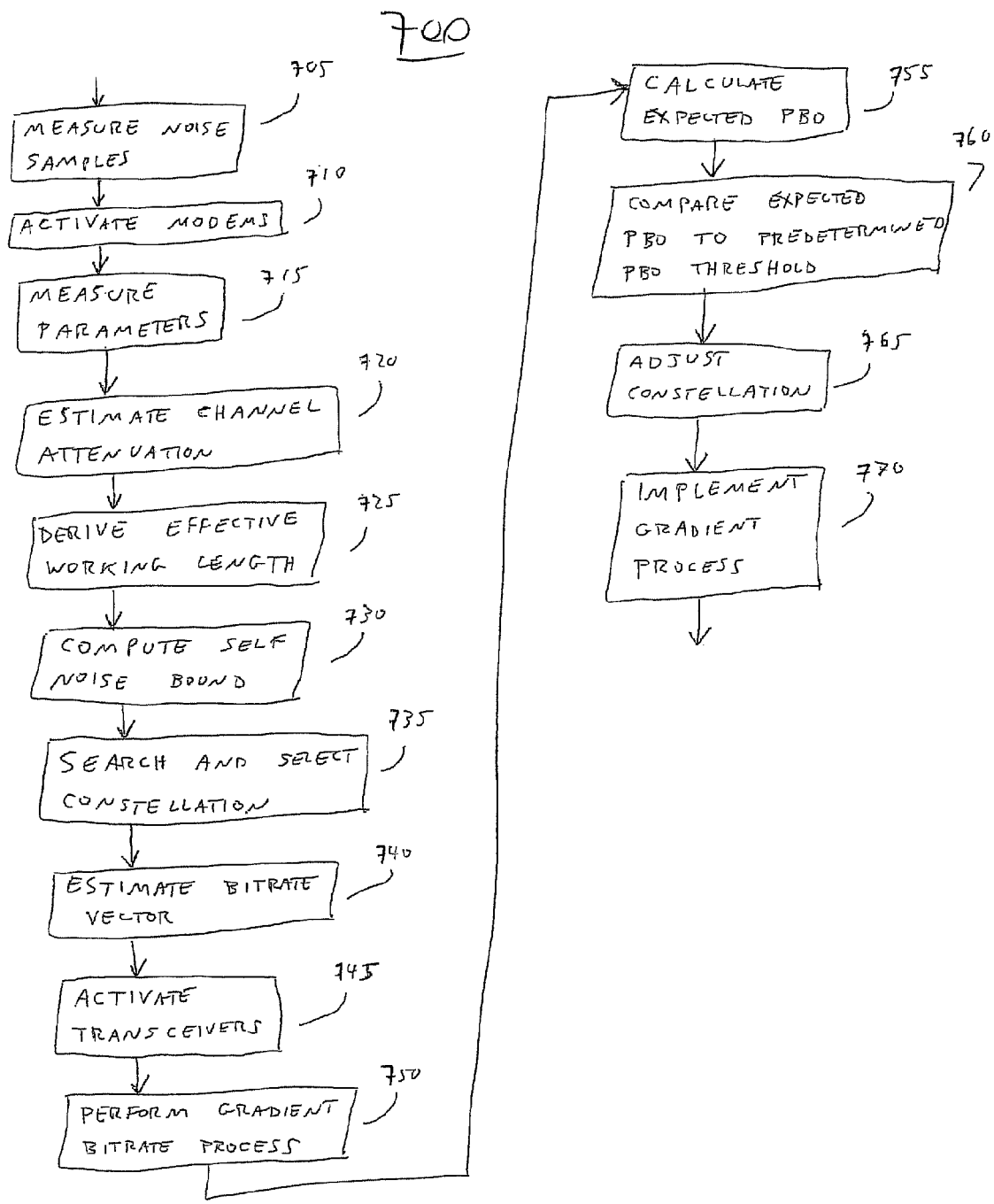
FIG. 7 is a flow diagram illustrating an embodiment of a DSS method according to embodiments of the present invention.

An embodiment of a DSS algorithm with this modification may be expressed mathematically and with reference to FIG. 7.

Noise samples that may be received at time $T_0$ may be measured (block 705) at a network side, e.g., CO-facing side, $$Na_{N_{T_0}}^{ij}(f)$$

and a customer side, e.g., RT-facing side, $$Na_{U_{T_0}}^{ij}(f),$$

where: i may be a copper pair index, and j may be a copper pair segment index.

Modems may be activated (block 710) with an initial parameter vector $Tx_{T_0}^{ij}(r_{min}, c_{16}, pbo_{init})$, where:

$r_{min}$ may be a predetermined bitrate, $c_{16}$ may denote a constellation that may be set to TC PAM 16, and $PBO_{ij,init}$ may denote an initial PBO value for a segment j of a copper pair i.

Parameters Nas, SNR, Rx and Tx may be measured (block 715):

$$Nas_{N_T}^{ij}(r, c, p, f), Nas_{U_T}^{ij}(r, c, p, f)$$

$$SNR_{N_T}^{ij}(r, c, p, Nas), SNR_{N_T}^{ij}(r, c, p, Nas)$$

$$Rx_{N_T}^{ij}(r, c, p), Rx_{U_T}^{ij}(r, c, p)$$

$$Tx_{N_T}^{ij}(pbo), Tx_{U_T}^{ij}(pbo)$$

where: Nas may be an overall noise frequency samples at a receiver, and may include noise from other services, for example alien noise, and/or noise from other modems that may be in a bonded group, for example self noise, SNR is Signal to Noise Ratio, Rx is received signal power, and Tx is Transmit signal power (noted as p=pmax-PBO).

Channel attenuation A (r) may be estimated (block 720). Effective Working Length $EWL^{ij}$ may be derived (block 725). A self noise bound $$Ns_{T_k}^{ij}(r_{ij}, c_k, p_0, f)$$

for higher bitrates may be computed (block 730). Constellations may be searched and an appropriate constellation $c_k^{ij}$ may be selected (block 735) according to $EWL^{ij}$ and $pbo_{init}$ that may maintain a stable link under worst-case noise conditions in a median bitrate. In some embodiments, a search process for a bitrate, a constellation size, and/or a PBO vector may be further optimized by, for example, initiating a coarse search on one or more of these parameters on a grid that may have a predefined cost function, e.g., signal to alien noise, signal to overall noise, etc., and then may converge using iterative gradient methods on a fine grid.

A bitrate vector may be estimated (block 740) to meet a bonded link target bitrate, and the following constraints may apply:

a. $r_{ij} = \min\left(w_{ij}\frac{R}{N}, r_{ij}\max\right) @ \sum_{i=1}^{N} r_{ij} = R$ b. $\hat{w}_{ij} = \dfrac{\frac{1}{N}\sum_{k=1}^{N} Np^{kj}}{Np^{ij}}$ where R is bonded link bitrate that may be required, N is number of pairs in a bonded link, Np is noise power at a receiver, and $\hat{w}_{ij}$ are initial weights estimates.

In some embodiments, weights $w_{ij}$ may be optimized for different cost functions, for example (1) for a minimum interference to other services, in which case Np may be a relative portion of alien noise power, or, for example, (2) for a maximum bitrate, in which case Np may be an overall noise power, or, for example, (3) any combination of these cost functions.

Transceivers may be activated (block 745) with an estimated $Tx_{To}^{ij}(\hat{r}, \hat{c}_k, \hat{p}bo)$ and may perform a gradient bitrate process (block 750) according to a measured excess $SNR_T^{ij}$ vector. An expected $PBO_{ij}$ may be calculated (block 755) and compared to predefined PBO thresholds (block 760). A constellation $c_k^{ij}$ may be adjusted accordingly (block 765). After a target bitrate may be achieved, a gradient process may be started (block 770) that may converge $PBO_{ij}$ according to $PBO_{n+1}^{ij} = PBO_n^{ij} + \min(SNR_n^{ij} - SNR_{thresh}, PBO_{max\ step})$.

Figure 8:
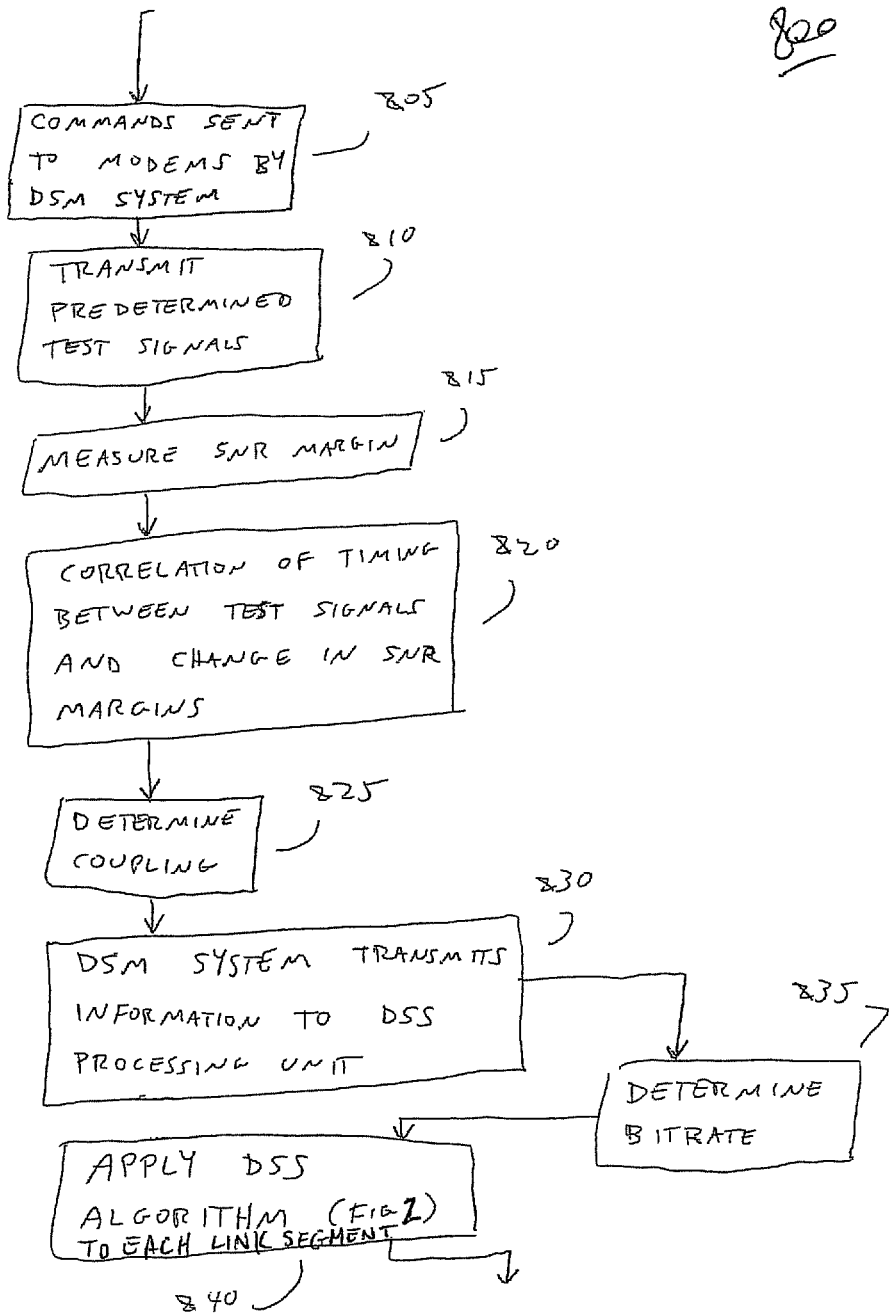
FIG. 8 is a flow diagram illustrating an embodiment of a DSS method using dynamic spectrum management (DSM) according to the present invention.

In an embodiment of the present invention a selective reduction of bitrate and an application of higher constellation sizes and PBO values may be even more effectively accomplished if DSS may be combined with a third-party Dynamic Spectrum Management (DSM) system, for example, of the kind used to monitor a majority of DSL services in a cable. In an embodiment of the invention, an integration of DSS with DSM may be accomplished using a method 800 described with reference to FIG. 8.

A DSM system may instruct SHDSL modems in a repeatered bonded copper link to transmit low-power test signals in a predetermined timed sequence (block 805). The modems may then transmit low-power test signals in the predetermined timed sequence as instructed by the DSM (block 810). The DSM system may simultaneously collect measured SNR margins from any or all monitored DSL services in a same cable (block 815). The DSM system may correlate a timing of transmitted test signals from different SHDSL modems with a timing of any observed reductions in an SNR margin of monitored residential DSL services (block 820), and may determine which, if any, of SHDSL modems may be strongly coupled with which, if any, of monitored DSL services (block 825). The DSM system may transmit to a DSS processing unit of a bonded communications link information about which SHDSL modems in that bonded link may be likely to interfere more with neighboring DSL services (block 830). A DSS processing unit may predetermine a bitrate (block 835) and then may apply a DSS algorithm, for example, as shown and described in connection with any of FIG. 2, 4A, 4B, 5, or 7 (block 840), in which the algorithm may be modified by reducing a bitrate of SHDSL modems reported by a DSM system and accordingly increasing a bitrate of remaining SHDSL modems, that may preserve a total bitrate of a bonded link. For example, a DSS processing unit may determine that one or more modems should be operating at reduced bitrates based on a determination made at block 825, and one or more modems may be able to operate at increased bitrates, also from a determination made at block 825. In this case, some modems may operate at a reduced bitrate and other modems may operate at an increased bitrate, where a total bitrate of the bonded link may be preserved.

Some embodiments of the present invention may involve an optimal or near-optimal selection of repeater locations. For example, when a carrier may be planning a deployment of repeatered links, it may be desirable to design a topology of these links so that benefits of DSS may be maximized For example, referring to schematic diagram of FIG. 3, a carrier may want to deploy a 20 Mbps repeatered link at a distance of 10 km from the CO 301, and residential DSL services 365 may only be deployed at shorter distances, for example, up to 4.5 km from the CO 301, where residential DSL services 365 may already exist and may be located closer to a CO 301 than a planned deployment of a repeatered high-speed data link. In such a scenario, it may be preferable to use a topology that may be shown in FIG. 3, where a length of segments 330, 335 and 340 that may be located in a same cable binder 360 as lines to residential DSL CPE locations 365 may add up to 5 km, and a length of segments 345 and 350 that may be outside of cable binder 360 may cover a remaining 5 km. Moreover, it may be preferable to make segment 330 and segment 340 somewhat shorter than segment 335, where power transmitted in an upstream direction into cable binder 360 by repeaters at node 315 and power transmitted in a downstream direction into cable binder 360 by modems at NT 370 may each be lower, due to a shorter distance that each may be transmitting across. These transmitters at locations 315 and 370 may be located closest to receivers at either end of a residential DSL link that may be located at CPE 365 for a downstream direction and at DSLAM 355 for an upstream direction. For example, lengths of segments 330, 335, 340, 345 and 350 may be chosen as 1.5 km, 2 km, 1.5 km, 2.5 km, and 2.5 km, respectively. This selection may ensure that benefits of DSS may be highest on segments 330 and 340 that may be closest to residential DSL receivers at CPE 365 and DSLAM 355, and may further reduce a spectral impact on upstream receivers of all residential DSL loops (on segment 330) and on downstream receivers of a longest residential DSL loop (on segment 340). Benefits of DSS on segments 345 and 350 may not be as important, since, for example there may be no residential DSL receivers being affected by those segments.

Accordingly, one aspect of embodiments of the present invention may include a process 900 for repeater location optimization, as described with reference to FIG. 9. Certain physical parameters may be known or determined (block 905), for example, a total length of a repeatered link, a makeup of copper loops, e.g., what may be a gauge and a length of copper wires that may make up these loops, a maximum number of repeater locations, a maximum number of copper pairs that may be included in a bonded copper link and possible locations of residential DSL receivers that may need to be protected from spectral interference. A maximum acceptable impact on residential DSL receivers at each of these possible locations may be established (block 910). A desired bitrate of a repeatered link may be set (block 920). A vector of possible segment lengths for each segment in a repeatered link may be defined (block 930). For each possible combination of segment lengths that may add up to a total length of a repeatered link, and for each number of copper pairs in a bonded link, a maximum achievable bitrate of a repeatered link may be estimated (block 940). A DSS algorithm, for example, as depicted in FIG. 2, may be applied (block 950), either in an existing system having similar distances at another location, or by simulation, for example by calculation. If a maximum achievable bitrate may be greater than or equal to the desired bitrate of a repeatered link, a spectral impact of a repeatered link operating at a desired bitrate with DSS on residential DSL receivers at all possible residential DSL locations may be estimated (block 960). A resulting spectral impact on residential DSL services may be compared to, and determined to be below, a maximum acceptable impact at each of these possible locations (block 970). Combinations of segment lengths and number of copper pairs that may provide a desirable bitrate on a repeatered link while generating no more than a maximum acceptable impact on residential DSL services may be identified and recorded for future reference (block 980). Certain calculations may be repeated for different segment length combinations (block 975), and the results compared to the best stored length combination. Thus, the estimation of bit rate (block 940), application of a DSS algorithm (block 950), estimation of spectral impact to DSL receivers (block 960), comparison of estimated spectral impact to maximum acceptable impact (block 970), and identification and recording of length combinations of favorable comparisons (block 980) may be repeated for each segment length combination. From among the identified combinations, ones that may optimize a specified criterion may be selected (block 990), such as, for example, (a) minimization of a total equipment cost of a repeatered link, or (b) minimization of a number of repeater locations, or (c) minimization of a number of copper pairs in a repeatered link, or (d) minimization of a spectral impact on residential DSL services, or (e) maximization of an achievable bitrate of a repeatered link, or (f) any weighted combination of the above.

A process represented by FIG. 9 may encompass some of the possible options for an optimal selection of repeater locations. There may be many other embodiments that may implement a same concept in different ways with additional modifications to this algorithm.

It will be recognized that the present invention is not limited by the examples provided herein. For example, an implementation of a DSS process in accordance with the present invention may add additional steps, and therefore may add additional time, to a regular training process of a bonded copper link. In a case of repeatered links, a training time added by a DSS process may be unacceptably high if a DSS process may be applied sequentially to each link segment. Therefore, it may be desirable to accelerate a DSS process by executing steps of the DSS algorithm for repeatered links in parallel for all modems in all link segments.

In some embodiments of the present invention, this acceleration of a DSS process may be accomplished by transmitting constellation sizes and PBO values simultaneously to all repeaters, and specifically by inserting their values in a part of the EFM (Ethernet in the First Mile) handshake message header that may be reserved for vendor-proprietary messages, and then including this DSS-specific message in headers of an EFM handshake messages transmitted to all modems in a repeatered copper link. An EFM handshake message structure may be, for example, as defined in clause 61.4 of an IEEE 802.3ah standard.

While certain features of the invention have been illustrated and described herein, many modifications, substitutions, changes, and equivalents will now occur to those of ordinary skill in the art. It is, therefore, to be understood that the appended claims are intended to cover all such modifications and changes as fall within the true spirit of the invention.

What is claimed is:

1. In a system including a network terminal and a remote terminal connected by one or more communication links, wherein each communication link includes one or more modem transmitters connected to one or more corresponding modem receivers, the method comprising:

activating the one or more modem transmitters and corresponding modem receivers to achieve a desired bitrate; and performing at least once on at least one of the one or more communication links:

obtaining a signal-to-noise ratio (SNR) margin for the one or more modem receivers on the respective communication link, determining an excess SNR margin based on an excess of the obtained SNR margin over a desired SNR margin for the one or more modem receivers of the respective communication link, modifying constellation size of the corresponding modem transmitter of the communication link to a next available constellation size based on a comparison of the excess SNR margin to a first threshold value, and reducing transmission power of the corresponding modem transmitter of the communication link if the excess SNR margin is greater than a second threshold value.

2. The method of claim 1, wherein modifying the constellation size of the corresponding modem transmitter to a next available constellation size comprises increasing the constellation size of the corresponding modem transmitter to a next greater available constellation size if the excess SNR margin is greater than the first threshold value.

3. The method of claim 2, comprising first increasing constellation size until a maximum available constellation size for the link is reached, and then, if the excess SNR margin at the maximum available constellation size is greater than the second threshold value, reducing transmission power on the link.

4. The method of claim 1, wherein modifying the constellation size of the corresponding modem transmitter to a next available constellation size comprises decreasing the constellation size of the corresponding modem transmitter to a next lower available constellation size if the excess SNR margin is less than the first threshold value.

5. The method of claim 1, comprising first reducing transmission power on the link until a minimum transmission power is reached, and then, based on a comparison of the excess SNR margin at the minimum transmission power to the first threshold value, modifying constellation size of the link to a next available constellation size.

6. The method of claim 5, wherein modifying constellation size of the link to a next available constellation size comprises decreasing the constellation size of the corresponding modem transmitter to a next lower available constellation size if the excess SNR margin is less than the first threshold value.

7. The method of 1, wherein the desired bitrate is a predetermined bitrate.

8. The method of 1, wherein the desired bitrate is a maximum available bitrate.

9. The method of claim 1, comprising performing a plurality of times on at least one of the communication links the steps of obtaining the SNR margin, determining the excess SNR margin, modifying the constellation size, and reducing transmission power.

10. The method of claim 1, wherein the system comprises a plurality of communication links, the method comprising performing a plurality of times on each of the plurality of communication links the steps of obtaining the SNR margin, determining the excess SNR margin, modifying the constellation size, and reducing transmission power.

11. The method of claim 1, wherein the system comprises a plurality of communication links, the method comprising performing at least once on each of the plurality of communication links the steps of obtaining the SNR margin, determining the excess SNR margin, modifying the constellation size, and reducing transmission power.

12. The method of claim 11, wherein determining one or more desired signal-to-noise ratio (SNR) margins for the plurality of communication links comprises determining the same desired SNR margin for each of the plurality of communication links.

13. The method of claim 11, wherein determining one or more desired signal-to-noise ratio (SNR) margins for the plurality of communication links comprises determining a plurality of desired SNR margins for each of the plurality of communication links, respectively.

14. The method of claim 1, wherein the desired bitrate is a desired upstream bitrate of the communication link from the remote terminal to the network terminal, the upstream bitrate of the communication link being different than a downstream bitrate of the communication link from the network terminal to the remote terminal.

15. The method of claim 1, wherein the desired bitrate is a desired downstream bitrate of the communication link from the network terminal to the remote terminal, the downstream bitrate of the communication link being different than an upstream bitrate of the communication link from the remote terminal to the network terminal.

16. The method of claim 1, wherein the constellation size and the transmission power are upstream constellation size and upstream transmission power of the communication link from the remote terminal to the network terminal, the upstream constellation size and upstream transmission power of the communication link being different than downstream constellation size and downstream transmission power of the communication link from the network terminal to the remote terminal.

17. The method of claim 1, wherein the constellation size and the transmission power are downstream constellation size and downstream transmission power of the communication link from the network terminal to the remote terminal, the downstream constellation size and downstream transmission power of the communication link being different than upstream constellation size and upstream transmission power of the communication link from the remote terminal to the network terminal.

18. A communication system comprising:
a network terminal including a network terminal (NT) processor operatively connected to one or more network terminal (NT) modems; and
one or more communication links connecting the one or more NT modems, respectively, to one or more respective remote terminal (RT) modems,
wherein for each of the one or more communication links, the NT processor is adapted to activate the one or more NT modems and corresponding RT modems to achieve a desired bitrate, and to perform the following sequence at least once:
obtain a signal-to-noise ratio (SNR) margin for the one or more modem receivers on the respective communication link,
determine an excess SNR margin based on an excess of the obtained SNR margin over a desired SNR margin for the one or more modem receivers of the respective communication link,
modify constellation size of the corresponding modem transmitter of the respective communication link to a next available constellation size based on a comparison of the excess SNR margin to a first threshold value, and
reduce transmission power of the corresponding modem transmitter of the respective communication link if the excess SNR margin is greater than a second threshold value.

19. The system of claim 18, wherein for each of the plurality of links, the NT processor is further adapted to perform the following sequence at least once:
modify constellation size of the corresponding modem transmitter of the respective communication link to a next available constellation size by instructing the corresponding modem transmitter to increase constellation size, and
reduce transmission power of the corresponding modem transmitter of the respective communication link by instructing the corresponding modem transmitter to reduce transmission power.

20. The system of claim 18, wherein the NT processor is adapted to modify the constellation size of the corresponding modem transmitter to a next available constellation size by increasing the constellation size of the corresponding modem transmitter to a next greater available constellation size if the excess SNR margin is greater than the first threshold value.

21. The system of claim 20, wherein the NT processor is adapted to first modify the constellation size of the corresponding modem transmitter by increasing constellation size until a maximum available constellation size for the link is reached, and then, if the excess SNR margin at the maximum available constellation size is greater than the second threshold value, reduce transmission power on the link.

22. The system of claim 18, wherein the NT processor is adapted to modify the constellation size of the corresponding modem transmitter to a next available constellation size by decreasing the constellation size of the corresponding modem transmitter to a next lower available constellation size if the excess SNR margin is less than the first threshold value.

23. The system of claim 18, wherein the NT processor is adapted to first reduce transmission power on the link until a minimum transmission power is reached, and then, based on a comparison of the excess SNR margin at the minimum transmission power to the first threshold value, modify constellation size of the link to a next available constellation size.

24. The system of claim 23, wherein based on the comparison of the excess SNR margin at the minimum transmission power to the first threshold value, the NT processor is to modify constellation size of the link to a next available constellation size by decreasing the constellation size of the corresponding modem transmitter to a next lower available constellation size if the excess SNR margin is less than the first threshold value.

25. The system of 18, wherein the desired bitrate is a predetermined bitrate.

26. The system of 18, wherein the desired bitrate is a maximum available bitrate.

27. The system of claim 18, wherein the NT processor is to perform a plurality of times on at least one of the communication links the steps of obtaining the SNR margin, determining the excess SNR margin, modifying the constellation size, and reducing transmission power.

28. The system of claim 18, wherein the system comprises a plurality of communication links, and wherein the NT processor is to perform a plurality of times on each of the plurality of communication links the steps of obtaining the SNR margin, determining the excess SNR margin, modifying the constellation size, and reducing transmission power.

29. The system of claim 18, wherein the system comprises a plurality of communication links, and wherein the NT processor is to perform at least once on each of the plurality of communication links the steps of obtaining the SNR margin, determining the excess SNR margin, modifying the constellation size, and reducing transmission power.

30. The system of claim 29, wherein the NT processor is to determine one or more desired signal-to-noise ratio (SNR) margins for the plurality of communication links by determining the same desired SNR margin for each of the plurality of communication links.

31. The system of claim 29, wherein the NT processor is to determine one or more desired signal-to-noise ratio (SNR) margins for the plurality of communication links by determining a plurality of desired SNR margins for each of the respective plurality of communication links.

32. The system of claim 18, wherein the desired bitrate is a desired upstream bitrate of the communication link from the remote terminal to the network terminal, the upstream bitrate of the communication link being different than a downstream bitrate of the communication link from the network terminal to the remote terminal.

33. The system of claim 18, wherein the desired bitrate is a desired downstream bitrate of the communication link from the network terminal to the remote terminal, the downstream bitrate of the communication link being different than an upstream bitrate of the communication link from the remote terminal to the network terminal.

34. The system of claim 18, wherein the constellation size and the transmission power are upstream constellation size and upstream transmission power of the communication link, the upstream constellation size and upstream transmission power of the communication link being different than downstream constellation size and downstream transmission power of the communication link.

35. The system of claim 18, wherein the constellation size and the transmission power are downstream constellation size and downstream transmission power of the communication link, the downstream constellation size and downstream transmission power of the communication link being different than upstream constellation size and upstream transmission power of the communication link.

36. In a system including a network terminal and one or more remote terminals connected by one or more respective communication links, each communication link having a plurality of link segments connected by repeaters, the method comprising:

activating the link segments to achieve a desired bitrate; and for each of a plurality of link segments in one or more communication links, performing the following at least once:

obtaining a signal-to-noise ratio (SNR) margin for the one or more modem receivers on the respective link segment, determining an excess SNR margin based on an excess of the obtained SNR margin over a desired SNR margin for the one or more modem receivers of the respective link segment, and modifying a first transmission characteristic of the corresponding modem transmitter of the link segment based on a comparison of the excess SNR margin to a first threshold value.

37. The method of claim 36, wherein the first transmission characteristic is a constellation size of the corresponding modem transmitter of the link segment.

38. The method of claim 37, wherein modifying the constellation size of the corresponding modem transmitter to a next available constellation size comprises increasing the constellation size of the corresponding modem transmitter to a next greater available constellation size if the excess SNR margin is greater than the first threshold value.

39. The method of claim 38, comprising increasing constellation size until a maximum available constellation size for the link segment is reached, and further comprising reducing transmission power of the corresponding modem transmitter on the link segment if the excess SNR margin at the maximum available constellation size is greater than a second threshold value.

40. The method of claim 37, wherein modifying the constellation size of the corresponding modem transmitter to a next available constellation size comprises decreasing the constellation size of the corresponding modem transmitter to a next lower available constellation size if the excess SNR margin is less than the first threshold value.

41. The method of claim 37, comprising reducing transmission power on the link segment until a minimum transmission power is reached, and then, based on a comparison of the excess SNR margin at the minimum transmission power to the first threshold value, modifying constellation size of the link segment to a next available constellation size.

42. The method of claim 41, wherein modifying constellation size of the link segment to a next available constellation size comprises decreasing the constellation size of the corresponding modem transmitter to a next lower available constellation size if the excess SNR margin is less than the first threshold value.

43. The method of claim 36, wherein the first transmission characteristic is a transmission power of the corresponding modem transmitter of the link segment.

44. The method of claim 43, wherein modifying the transmission power comprises reducing the transmission power of the corresponding modem transmitter of the link segment if the excess SNR margin is greater than the first threshold value.

45. The method of 36, wherein the desired bitrate is a predetermined bitrate.

46. The method of 36, wherein the desired bitrate is a maximum available bitrate.

47. The method of claim 36, comprising performing a plurality of times on at least one of the link segments the steps of obtaining the SNR margin, determining the excess SNR margin, and modifying the first transmission characteristic.

48. The method of claim 36, wherein the system comprises a plurality of communication links, the method comprising performing at least once on each of the communication links for each of the link segments in the respective communication links the steps of obtaining the SNR margin, determining the excess SNR margin, and modifying the first transmission characteristic constellation size.

49. The method of claim 36, wherein determining one or more desired signal-to-noise ratio (SNR) margins for the plurality of link segments comprises determining the same desired SNR margin for each of the plurality of link segments in a communications link.

50. The method of claim 36, wherein determining one or more desired signal-to-noise ratio (SNR) margins for the plurality of link segments comprises determining a plurality of desired SNR margins for each of the plurality of link segments in a communications link, respectively.

51. The method of claim 36, wherein the desired bitrate is a desired upstream bitrate of the link segments from the remote terminal toward the network terminal, the upstream bitrate of the link segment being different than a downstream bitrate of the link segment from the network terminal toward the remote terminal.

52. The method of claim 36, wherein the desired bitrate is a desired downstream bitrate of the link segment from the network terminal toward the remote terminal, the downstream bitrate of the link segment being different than an upstream bitrate of the link segment from the remote terminal toward the network terminal.

53. The method of claim 36, wherein the constellation size and the transmission power are upstream constellation size and upstream transmission power of the link segment from the remote terminal toward the network terminal, the upstream constellation size and upstream transmission power of the link segment being different than downstream constellation size and downstream transmission power of the link segment from the network terminal toward the remote terminal.

54. The method of claim 36, wherein the constellation size and the transmission power are downstream constellation size and downstream transmission power of the link segment from the network terminal toward the remote terminal, the downstream constellation size and downstream transmission power of the link segment being different than upstream constellation size and upstream transmission power of the link segment from the remote terminal toward the network terminal.

55. The method of claim 36, further comprising before activating the modems, training the modems using each available constellation size for the modems, wherein activating the modems comprises activating the modems at a constellation size selected to achieve a desired bitrate, wherein the first transmission characteristic is transmission power of the corresponding modem transmitter of the link segment.

56. The method of claim 55, wherein modifying the first transmission characteristic comprises reducing the transmission power of the corresponding modem transmitter of the link segment if the excess SNR margin is greater than the first threshold value.

57. A repeatered communication system comprising:
 a network terminal including a network terminal (NT) processor operatively connected to one or more network terminal (NT) modems; and
 one or more communication links connecting the network terminal to the remote terminal, each communication link having a plurality of link segments connected by repeaters, each repeater adapted to transmit signal-to-noise data to the NT processor, and adapted to modify at least a first transmission characteristic on the respective link segment based on an instruction from the NT processor,
 wherein for each of the one or more link segments on a communication link, the NT processor is adapted to activate the one or more NT modems and corresponding RT modems to achieve a desired bitrate, and to perform the following sequence at least once:
  obtain a signal-to-noise ratio (SNR) margin for the one or more modem receivers on the respective link segment,
  determine an excess SNR margin based on an excess of the obtained SNR margin over a desired SNR margin for the one or more modem receivers of the respective link segment, and
  modify a first transmission characteristic of the corresponding modem transmitter of the link segment based on a comparison of the excess SNR margin to a first threshold value.

58. The system of claim 57, wherein the first transmission characteristic is a constellation size of the corresponding modem transmitter of the link segment.

59. The system of claim 58, wherein the NT processor is adapted to modify the constellation size of the corresponding modem transmitter to a next available constellation size by increasing the constellation size of the corresponding modem transmitter to a next greater available constellation size if the excess SNR margin is greater than the first threshold value.

60. The system of claim 59, wherein the NT processor is adapted to increase constellation size until a maximum available constellation size for the link segment is reached, and to reduce transmission power of the corresponding modem transmitter on the link segment if the excess SNR margin at the maximum available constellation size is greater than a second threshold value.

61. The system of claim 58, wherein the NT processor is adapted to modify the constellation size of the corresponding modem transmitter to a next available constellation size by decreasing the constellation size of the corresponding modem transmitter to a next lower available constellation size if the excess SNR margin is less than the first threshold value.

62. The system of claim 58, wherein the NT processor is adapted to reduce transmission power on the link segment until a minimum transmission power is reached, and then, based on a comparison of the excess SNR margin at the minimum transmission power to the first threshold value, modify constellation size of the link segment to a next available constellation size.

63. The system of claim 62, wherein the NT processor is adapted to modify constellation size of the link segment to a next available constellation size by decreasing the constellation size of the corresponding modem transmitter to a next lower available constellation size if the excess SNR margin is less than the first threshold value.

64. The system of claim 57, wherein the first transmission characteristic is a transmission power of the corresponding modem transmitter of the link segment.

65. The system of claim 64, wherein the NT processor is adapted to modify the transmission power by reducing the transmission power of the corresponding modem transmitter of the link segment if the excess SNR margin is greater than the first threshold value.

66. The system of 57, wherein the desired bitrate is a predetermined bitrate.

67. The system of 57, wherein the desired bitrate is a maximum available bitrate.

68. The system of claim 57, wherein the NT processor is adapted to perform a plurality of times on at least one of the link segments the steps of obtaining the SNR margin, determining the excess SNR margin, and modifying the first transmission characteristic.

69. The system of claim 57, wherein the system comprises a plurality of communication links, wherein the NT processor is adapted to perform at least once on each of the communication links for each of the link segments in the respective communication links the steps of obtaining the SNR margin, determining the excess SNR margin, and modifying the first transmission characteristic constellation size.

70. The system of claim 57, wherein the NT processor is adapted to determine one or more desired signal-to-noise ratio (SNR) margins for the plurality of link segments by determining the same desired SNR margin for each of the plurality of link segments in a communications link.

71. The system of claim 57, wherein the NT processor is adapted to determine one or more desired signal-to-noise ratio (SNR) margins for the plurality of link segments by determining a plurality of desired SNR margins for each of the plurality of link segments in a communications link, respectively.

72. The system of claim 57, wherein the desired bitrate is a desired upstream bitrate of the link segments from the remote terminal toward the network terminal, the upstream bitrate of the link segment being different than a downstream bitrate of the link segment from the network terminal toward the remote terminal.

73. The system of claim 57, wherein the desired bitrate is a desired downstream bitrate of the link segment from the network terminal toward the remote terminal, the downstream bitrate of the link segment being different than an upstream bitrate of the link segment from the remote terminal toward the network terminal.

74. The system of claim 57, wherein the constellation size and the transmission power are upstream constellation size and upstream transmission power of the link segment from the remote terminal toward the network terminal, the upstream constellation size and upstream transmission power of the link segment being different than downstream constellation size and downstream transmission power of the link segment from the network terminal toward the remote terminal.

75. The system of claim 57, wherein the constellation size and the transmission power are downstream constellation size and downstream transmission power of the link segment from the network terminal toward the remote terminal, the downstream constellation size and downstream transmission power of the link segment being different than upstream constellation size and upstream transmission power of the link segment from the remote terminal toward the network terminal.

76. The system of claim 57, wherein before activating the modems, the NT processor is adapted to train the modems using each available constellation size for the modems, and wherein the NT processor is adapted to activate the modems by activating the modems at a constellation size selected to achieve a desired bitrate, wherein the first transmission characteristic is transmission power of the corresponding modem transmitter of the link segment.

77. The system of claim 76, wherein the NT processor is adapted to modify the first transmission characteristic by reducing the transmission power of the corresponding modem transmitter of the link segment if the excess SNR margin is greater than the first threshold value.

* * * * *